(12) United States Patent
Takagi

(10) Patent No.: US 9,885,468 B2
(45) Date of Patent: Feb. 6, 2018

(54) LIGHT EMITTING DEVICE, IMAGE DISPLAY DEVICE, AND ELECTRONIC APPARATUS

(71) Applicant: Japan Display Inc., Tokyo (JP)

(72) Inventor: Masashi Takagi, Tokyo (JP)

(73) Assignee: Japan Display Inc., Tokyo (JP)

( * ) Notice: Subject to any disclaimer, the term of this patent is extended or adjusted under 35 U.S.C. 154(b) by 430 days.

(21) Appl. No.: 14/605,428

(22) Filed: Jan. 26, 2015

(65) Prior Publication Data

US 2015/0213767 A1    Jul. 30, 2015

(30) Foreign Application Priority Data

Jan. 29, 2014    (JP) .................. 2014-014594

(51) Int. Cl.
*F21V 23/04*    (2006.01)
*G09G 3/34*    (2006.01)
*G02F 1/1335*    (2006.01)

(52) U.S. Cl.
CPC ......... *F21V 23/0457* (2013.01); *G09G 3/342* (2013.01); *G09G 3/3426* (2013.01); *G02F 1/133603* (2013.01); *G02F 2203/60* (2013.01); *G09G 2320/041* (2013.01)

(58) Field of Classification Search
CPC .......... F21V 23/0457; G02F 1/133603; G02F 2203/60; G09G 2320/041
USPC ............................. 345/101; 361/679.01–821
See application file for complete search history.

(56) References Cited

FOREIGN PATENT DOCUMENTS

JP    2009-199745    9/2009

*Primary Examiner* — Michael Pervan
(74) *Attorney, Agent, or Firm* — K&L Gates LLP

(57) ABSTRACT

According to an aspect, a light emitting device includes a base that includes at least a frame body; a light source that emits light; and a temperature sensor with which the base is provided and that detects changes in temperature of the light source. A space is provided between the temperature sensor and a portion of the base corresponding to a portion in which the temperature sensor is provided.

20 Claims, 15 Drawing Sheets

LIGHT EMITTING DEVICE, IMAGE DISPLAY DEVICE, AND ELECTRONIC APPARATUS

CROSS REFERENCES TO RELATED APPLICATIONS

The present application claims priority to Japanese Priority Patent Application JP 2014-014594 filed in the Japan Patent Office on Jan. 29, 2014, the entire content of which is hereby incorporated by reference.

BACKGROUND

1. Technical Field

The present disclosure relates to a light emitting device, an image display device, and an electronic apparatus.

2. Description of the Related Art

A liquid crystal display device is an image display device that does not have a light emitting function, and is used integrally with a light emitting device that irradiates a liquid crystal panel serving as a display screen with light. Examples of the light emitting device include an edge-light type light emitting device in which a light source is placed at an edge portion of a light guide plate that is provided on the back surface of a liquid crystal panel, and a direct-type light emitting device in which a light source is placed on the back surface or the front surface of a liquid crystal panel. The examples of the light emitting device further include a backlight-type light emitting device that irradiates a transmissive liquid crystal panel with light from the back surface thereof, and a front-light type light emitting device that irradiates a reflective liquid crystal panel with light from the front surface thereof.

When the light emitting device emits light, a light source generates radiant heat. By the radiant heat of the light source, the temperature of a liquid crystal panel may rise, and whereby the display quality may be degraded and electronic devices may give out due to overheating. Hence, there has been an invention of a light emitting device in which the temperature of a light source is measured by providing a thermistor on the light emitting device and measuring the resistance value of the thermistor (see Japanese Patent Application Laid-open No. 2009-199745). When a rise in temperature of the light source is high, the luminance of the light emitting device is lowered so as to suppress the rise in temperature of a liquid crystal panel. In other words, the thermistor has a function of derating the light emitting device (making it operate at a lower than rated value) with respect to the temperature.

When a thermistor is installed in a light emitting device, the thermistor is bonded to a base or the like of the light emitting device, for example. Due to variation with time and changes in temperature, however, there may be a case in which the bonding of the thermistor to the base comes off and the thermistor is separated and lifted from the base. If the thermistor is lifted from the base, the resistance value of the thermistor changes, and the detection value of the thermistor fluctuates. Consequently, the thermistor may not be able to derate the light emitting device appropriately with respect to the temperature. While the process control has been performed conventionally so as to prevent the lifting of the thermistor, the yield may be deteriorated.

For the foregoing reasons, there is a need for a light emitting device, an image display device, and an electronic apparatus that can suppress the change in detection value of a thermistor when the lifting of the thermistor arises.

SUMMARY

According to an aspect, a light emitting device includes a base that includes at least a frame body; a light source that emits light; and a temperature sensor with which the base is provided with that detects changes in temperature of the light source. A space is provided between the temperature sensor and a portion of the base corresponding to a portion in which the temperature sensor is provided.

Additional features and advantages are described herein, and will be apparent from the following Detailed Description and the figures.

DETAILED DESCRIPTION

Exemplary embodiments of the present disclosure will be described in detail with reference to the accompanying drawings in the following order.
1. First Embodiment
2. Second Embodiment
3. Third Embodiment
4. Fourth Embodiment
5. Modifications
6. Application Examples
7. Aspects of Present Disclosure 1. First Embodiment The following describes in detail forms to implement the disclosure (hereinafter referred to as embodiments) with reference to the accompanying drawings. The present disclosure, however, is not intended to be limited by the content of the following embodiments exemplified. The constituent elements described in the following include those that a person skilled in the art can easily assume or that are substantially the same. Furthermore, the constituent elements described in the following can be combined with as appropriate.

The following describes in detail a first embodiment with reference to the accompanying drawings.

Figure 1:
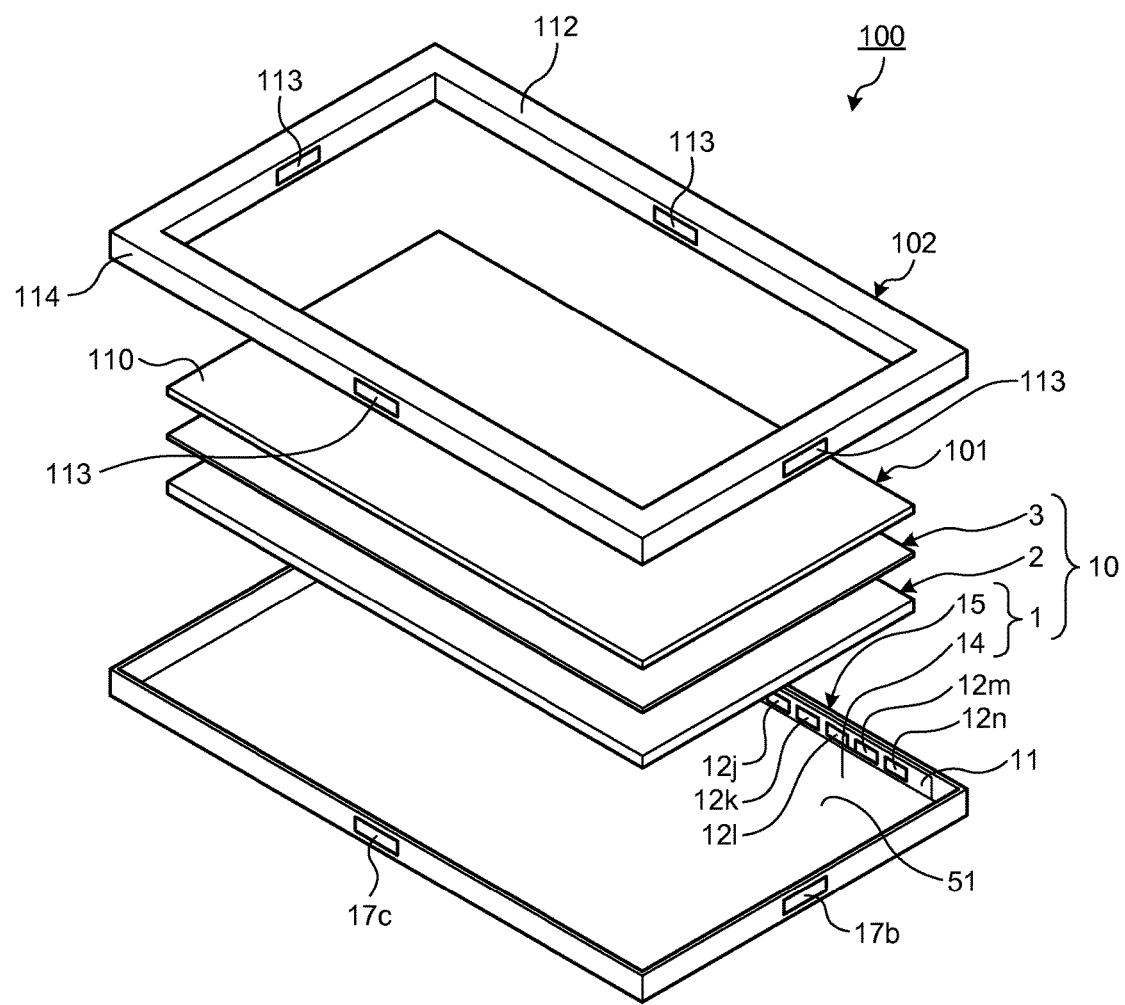
FIG. 1 is an exploded perspective view schematically illustrating the configuration of an image display device according to a first embodiment.

FIG. 1 is an exploded perspective view schematically illustrating the configuration of an image display device 100 according to the first embodiment. As illustrated in FIG. 1, the image display device 100 includes a light emitting device 10 that includes a base 1, a light guide plate 2, and an optical sheet 3; a liquid crystal panel 101; and a bezel 102. The image display device 100 and the light emitting device 10 in the first embodiment, the details of which will be described later, are of a backlight type and of an edge light type.

Figure 2:
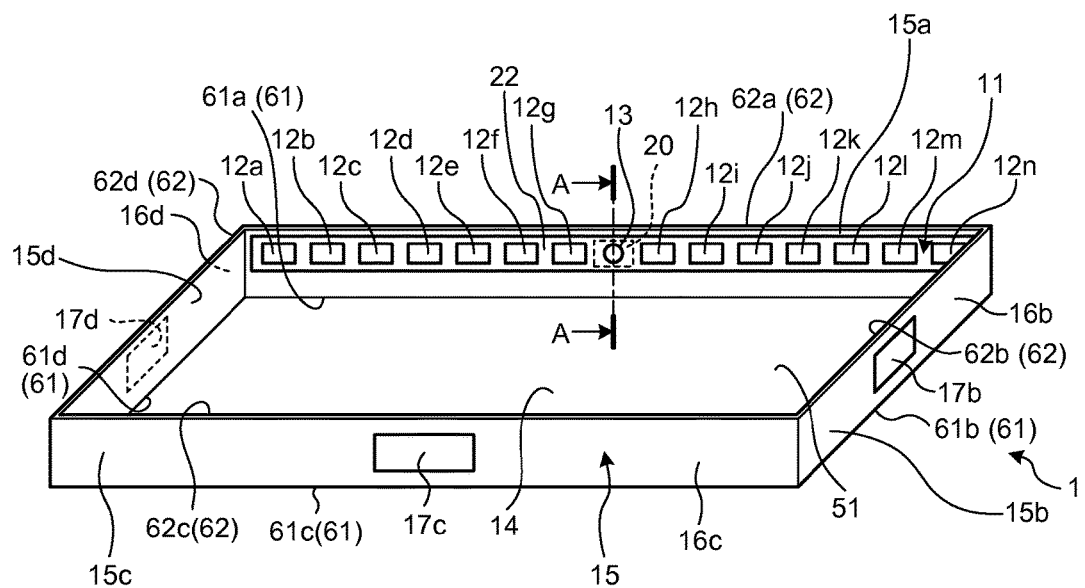
FIG. 2 is a perspective view of a base in the first embodiment.
Figure 3:
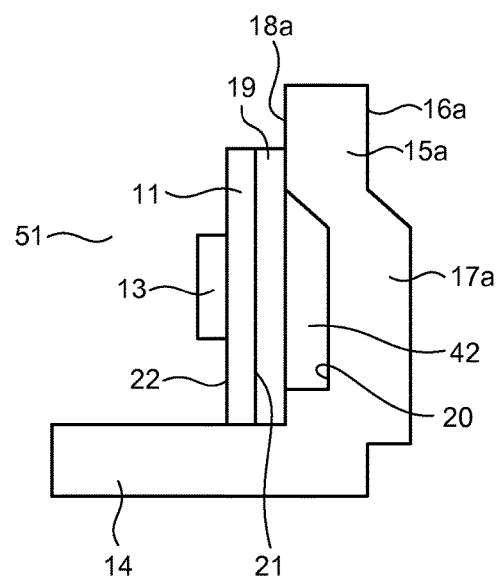
FIG. 3 is a cross-sectional view of the base in the first embodiment viewed along a line A-A in FIG. 2.

FIG. 2 is a perspective view of the base 1 in the first embodiment. FIG. 3 is a cross-sectional view of the base 1 in the first embodiment viewed along the line A-A in FIG. 2. As illustrated in FIG. 2, the base 1 includes a frame body 15 and a rectangular and plate-like shaped bottom portion 14. The frame body 15 is a frame-shaped member that opens in a rectangular shape, and includes a first sidewall portion 15a, a second sidewall portion 15b, a third sidewall portion 15c, and an fourth sidewall portion 15d. The first sidewall portion 15a is a lateral surface of the frame body 15 on one side of the long sides and extends from an end portion 61a on one side toward an end portion 62a on the other side. The second sidewall portion 15b is a lateral surface of the frame body 15 on one side of the short sides and extends from an end portion 61b on one side toward an end portion 62b on the other side. The third sidewall portion 15c is a lateral surface of the frame body 15 on the other side of the long sides and extends from an end portion 61c on one side toward an end portion 62c on the other side. The fourth sidewall portion 15d is a lateral surface of the frame body 15 on the other side of the short sides and extends from an end portion 61d on one side toward an end portion 62d on the other side. The end portions 61a, 61b, 61c, and 61d on one side form one end portion 61 of the frame body 15, and the end portions 62a, 62b, 62c, and 62d on the other side form the other end portion 62 of the frame body 15. The frame body 15 can be said to be a frame-shaped member that extends from the one end portion 61 toward the other end portion 62.

As illustrated in FIG. 2, the bottom portion 14 is attached to the one end portion 61 of the frame body 15 so as to cover the one end portion 61. By attaching the bottom portion 14 to the frame body 15, the base 1 is formed in a box shape in which the other end portion 62 is open. The base 1 is provided with a space 51 surrounded by the first sidewall portion 15a, the second sidewall portion 15b, the third sidewall portion 15c, and the fourth sidewall portion 15d, on the inner side of the base 1. Although the base 1 is manufactured with, for example, metallic material of high heat conductivity such as aluminum, it is not limited to this. While the shape of the bottom portion 14 in planar view and the shape of a portion surrounded by the frame body 15 in planar view are rectangular, they are not limited to this and they may be square, for example. In the first embodiment, the base 1 is manufactured with the frame body 15 and the bottom portion 14 in an integrated manner. However, the frame body 15 and the bottom portion 14 may be separate pieces. Furthermore, the base 1 may not include the bottom portion 14. While the crossing angle of a plane in parallel with the bottom portion 14 and an extending direction of the first sidewall portion 15a, the second sidewall portion 15b, the third sidewall portion 15c, and the fourth sidewall portion 15d is 90 degrees in the first embodiment, it is not limited to this.

As illustrated in FIG. 3, the first sidewall portion 15a includes a projecting portion 17a on an outer surface 16a that is the lateral surface on the opposite side of the surface on the space 51 side. The second sidewall portion 15b includes a projecting portion 17b on an outer surface 16b that is the lateral surface on the opposite side of the surface on the space 51 side. The third sidewall portion 15c includes a projecting portion 17c on an outer surface 16c that is the lateral surface on the opposite side of the surface on the space 51 side. The fourth sidewall portion 15d includes a projecting portion 17d on an outer surface 16d that is the lateral surface on the opposite side of the surface on the space 51 side.

As illustrated in FIG. 3, on an inner surface 18a that is the lateral surface of the first sidewall portion 15a on the space 51 side, a substrate 11 is attached with a bonding portion 19 therebetween. The substrate 11 is bonded to the bonding portion 19 at a back surface 21 on the opposite side of a surface 22 on which a circuit is mounted. While the bonding portion 19 is a double-sided adhesive tape, it is not limited to this, and it may be glue, for example. By using a double-sided adhesive tape as the bonding portion 19, the substrate 11 can be attached to the first sidewall portion 15a easily. While the substrate 11 is a flexible printed circuit (FPC) in the first embodiment, it is not limited to this, and it may be a printed circuit board (PCB) or a printed wiring board (PWB), for example. By using an FPC as the substrate 11, the substrate 11 can be attached to the first sidewall portion 15a easily. As illustrated in FIG. 2, on the surface 22 of the substrate 11, along the direction toward the second sidewall portion 15b from the fourth sidewall portion 15d, light emitting diodes (LEDs) 12a, 12b, 12c, 12d, 12e, 12f, 12g, 12h, 12i, 12j, 12k, 12l, 12m, and 12n are mounted as a light source. The LEDs 12a, 12b, 12c, 12d, 12e, 12f, 12g,

12h, 12i, 12j, 12k, 12l, 12m, and 12n are arranged along the direction toward the second sidewall portion 15b from the fourth sidewall portion 15d. The distance of the LEDs 12a to 12n between one another is not specifically limited, and it can be selected as appropriate. In the following description, the LEDs 12a to 12n are described as LEDs 12 when it is not necessary to distinguish them individually.

The LEDs 12 receive an electrical signal through the substrate 11, and emit light in response to the electrical signal. In the first embodiment, although 14 pieces of the LEDs 12 are mounted, the number of LEDs 12 is not limited to this. As for the light source, it is not limited to an LED, and for example, a fluorescent light and a cold-cathode tube can be used. As illustrated in FIGS. 2 and 3, a thermistor 13 serving as a temperature sensor is mounted to the surface 22 of the substrate 11. The thermistor 13 is located between the LED 12g and the LED 12h in the direction toward the second sidewall portion 15b from the fourth sidewall portion 15d. In the first embodiment, although the LEDs 12 and the thermistor 13 are mounted to the substrate 11 of the same substrate, the LEDs 12 and the thermistor 13 may be provided with respect to different substrates. For example, the substrate 11 may be manufactured with two substrates of a first substrate and a second substrate, and the first substrate may be provided with the LEDs 12 while the second substrate may be provided with the thermistor 13.

The thermistor 13 detects temperature by the radiant heat of the LEDs 12 and changes its own electrical resistance value. The detail of the function of the LEDs 12 and the thermistor 13 will be described later. The thermistor 13 is not limited to be located between the LED 12g and the LED 12h as long as it is placed at the location adjacent to the LEDs 12, and furthermore, a plurality of thermistors 13 may be provided. The first sidewall portion 15a is provided with the substrate 11, the LEDs 12, and the thermistor 13, but not limited thereto. Any one of the second sidewall portion 15b, the third sidewall portion 15c, and the fourth sidewall portion 15d may be provided with the substrate 11, the LEDs 12, and the thermistor 13. The a plurality of sidewall portions out of the first sidewall portion 15a, the second sidewall portion 15b, the third sidewall portion 15c, and the fourth sidewall portion 15d may be provided with the substrate 11, the LEDs 12, and the thermistor 13.

As illustrated in FIG. 3, a recessed portion 20 is formed on an inner surface 18a of the first sidewall portion 15a. The recessed portion 20 is formed by deforming the first sidewall portion 15a from the inner surface 18a toward the outer surface 16a, for example. Other than that, the recessed portion 20 may be formed by cutting out a part of the first sidewall portion 15a and deforming the cutout portion from the inner surface 18a toward the outer surface 16a. The recessed portion 20 faces the thermistor 13 with the substrate 11 and the bonding portion 19 therebetween. The recessed portion 20 forms a space 42 between the thermistor 13 and a portion of the first sidewall portion 15a provided with the thermistor 13. In other words, the space 42 is provided between the first sidewall portion 15a and a portion of the substrate 11 on the back surface 21 and opposite to the thermistor 13. Furthermore, at a portion of the first sidewall portion 15a on the outer surface 16a and opposite to the recessed portion 20, the projecting portion 17a is provided.

The light emitting device 10 is configured to house the light guide plate 2 and the optical sheet 3 in the space 51 that is the inside of the base 1. As illustrated in FIG. 1, in the space 51 of the base 1, the light guide plate 2 and the optical sheet 3 are stacked from the bottom portion 14 in this order. The image display device 100 is constituted by the liquid crystal panel 101 and the bezel 102 being provided on the optical sheet 3 of the light emitting device 10 from the bottom portion 14 in this order.

The liquid crystal panel 101 as an image display module is a liquid crystal layer sandwiched between a thin film transistor (TFT) array substrate and a color filter (CF) substrate. The liquid crystal panel 101 is placed inside the base 1 with an image display surface 110 turned upward. The liquid crystal panel 101 is irradiated with light from a back surface 111 on the opposite side of the image display surface 110, to be specific, light emitted from the edge-light type light emitting device 10, which will be described later. As for the image display module, as long as it is not a light-emitting image display module, it is not limited to a liquid crystal panel.

As illustrated in FIG. 1, the bezel 102 is a frame-like member composed of metallic material and others, and includes a frame wall portion 114 and a frame ceiling portion 112. The bezel 102 is put on the frame body 15 of the base 1 housing the light guide plate 2, the optical sheet 3, and the liquid crystal panel 101 and is secured. The frame wall portion 114 covers the outer surfaces 16a, 16b, 16c, and 16d of the first sidewall portion 15a, the second sidewall portion 15b, the third sidewall portion 15c, and the fourth sidewall portion 15d, respectively, of the base 1. The frame ceiling portion 112 covers the upper edge portions of the first sidewall portion 15a, the second sidewall portion 15b, the third sidewall portion 15c, and the fourth sidewall portion 15d of the base 1, and the outer edge of the image display surface 110 of the liquid crystal panel 101 that is housed inside the base 1. The frame wall portion 114 is provided with a plurality of recessed portions 113. These recessed portions 113 are fitted to the projecting portions 17a, 17b, 17c, and 17d of the base 1, and whereby the bezel 102 is secured to the base 1. When the bezel 102 is secured to the base 1, the light guide plate 2, the optical sheet 3, and the liquid crystal panel 101 are secured to one another, thereby forming the image display device 100. The light guide plate 2, the optical sheet 3, and the liquid crystal panel 101 may be provided with adhesion layers, for example, and secured to one another with glue or the like. While the recessed portions 113 have a through-hole shape in the first embodiment, they are not limited to this. In the first embodiment, the liquid crystal panel 101 is placed inside the base 1 and secured with the bezel 102. The liquid crystal panel 101, however, may be not placed inside the base 1 and not secured with the bezel 102. The configuration of the light emitting device 10 will be described next.

Figure 4:
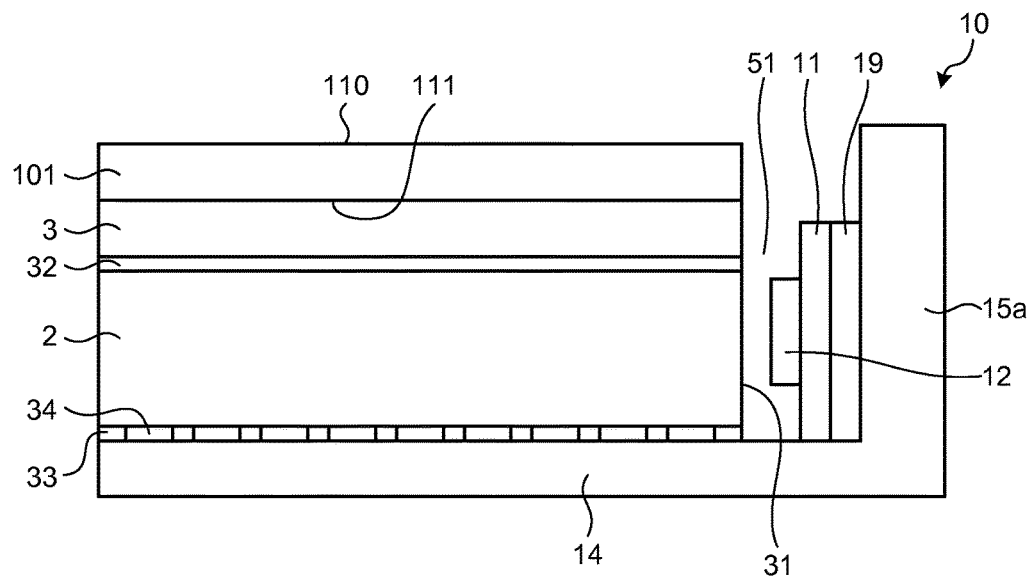
FIG. 4 is a cross-sectional view of a light emitting device in the first embodiment.

FIG. 4 is a cross-sectional view of the light emitting device 10 in the first embodiment. In the first embodiment, the light guide plate 2 is a rectangular plate that transmits light. Examples of the material used for the light guide plate 2 include acrylic resin, polycarbonate (PC) resin, methyl methacrylate-styrene copolymer (MS resin), etc. The light guide plate 2 includes a reflecting surface 33 that is a surface on one side and a light emitting surface 32 that is a surface on the other side. The light guide plate 2 is placed inside the base 1 so that a lateral surface 31 that is the lateral surface on the long side faces the LEDs 12. The light guide plate 2 emits the light from the LEDs 12, which entered from the lateral surface 31, from the light emitting surface 32 while expanding the light in the in-plane direction. The light emitted from the light emitting surface 32 of the light guide plate 2 enters the liquid crystal panel 101, which is provided at a location away from the bottom portion 14 of the base 1 than the light guide plate 2 inside the base 1, from the back surface 111 on the opposite side of the image display surface 110. The detail of irradiation of the liquid crystal panel 101 with light by the light emitting device 10 will be described later.

As illustrated in FIG. 4, a plurality of diffusing portions 34 are formed on the reflecting surface 33 of the light guide plate 2. When the light that entered the light guide plate 2 makes contact with the diffusing portions 34, the light is reflected in various directions, thereby, producing diffused light. A part of the diffused light is emitted from the light emitting surface 32 of the light guide plate 2. The diffusing portions 34 are formed by printing paint on the reflecting surface 33 of the light guide plate 2 in dots or in stripes, for example. Examples of the printing method include silk-screen printing, ink jet printing, etc. The number, shape, color, layout pattern, and others of the diffusing portions 34 are not limited to the foregoing, and are appropriately selected in accordance with the purpose.

As illustrated in FIG. 4, the optical sheet 3 is stacked on the light emitting surface 32 of the light guide plate 2. The optical sheet 3 adjusts the optical characteristics of the light emitted from the light emitting surface 32 of the light guide plate 2, and a photochromic sheet, a diffusing sheet, a prism sheet, or the like can be used. For the optical sheet 3, only a single sheet or a plurality of stacked sheets may be used. The light emitting device 10 may not include the optical sheet 3. Next, the irradiation of the liquid crystal panel 101 with light by the light emitting device 10 will be described.

Figure 5:
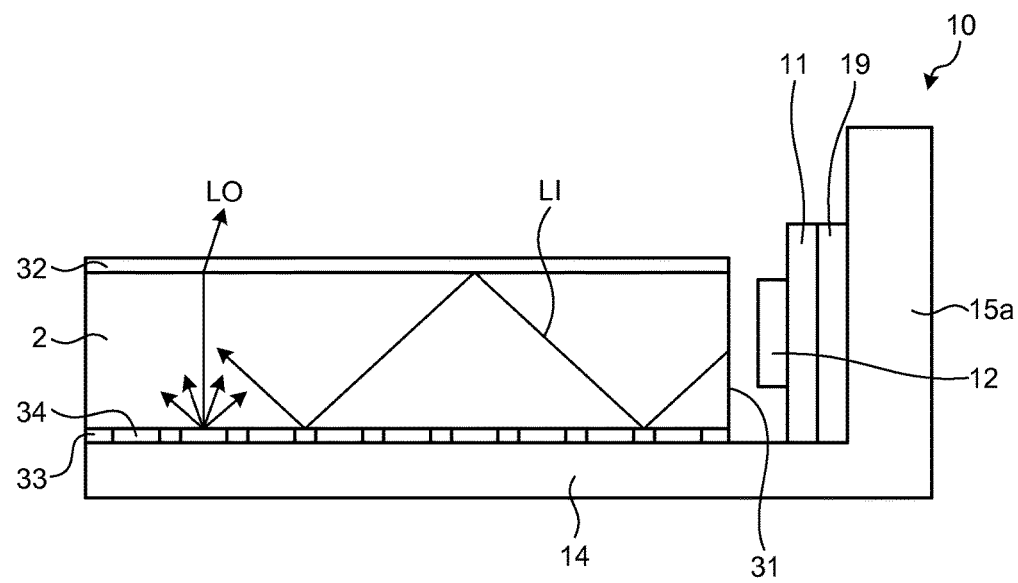
FIG. 5 is a schematic diagram illustrating a state of the light emitting device irradiating a liquid crystal panel with light in the first embodiment.

FIG. 5 is a schematic diagram illustrating the state of the light emitting device 10 irradiating the liquid crystal panel 101 with light in the first embodiment. As illustrated in FIG. 5, light LI from the LEDs 12, which enters the light guide plate 2 from the lateral surface 31, propagates in the light guide plate 2 by being repeatedly reflected by the light emitting surface 32 and the reflecting surface 33 of the light guide plate 2. A part of the light LI propagating in the light guide plate 2 is diffused at the diffusing portions 34 on the reflecting surface 33 of the light guide plate 2, and light LO that is a part of the diffused light is emitted from the light emitting surface 32. The light LO emitted from the light emitting surface 32 passes through the optical sheet 3 by which the optical characteristics of the light LO are adjusted, and enters the back surface 111 of the liquid crystal panel 101. Consequently, the light emitting device 10 in the first embodiment is of an edge light type and of a backlight type. It may be configured, by providing a reflective sheet between the reflecting surface 33 and the bottom portion 14 of the base 1, to reflect the light entering the reflecting surface 33 toward the light guide plate 2. Next, the function of the thermistor 13 will be described.

Thus, the LEDs 12 emit light by an electrical signal from the substrate 11, and let the light enter the light guide plate 2. The LEDs 12 generate radiant heat by the emission of light. For example, when the light emitting device 10 is operated for a long time by the radiant heat of the LEDs 12, the temperature of the light emitting device 10 may rise, and whereby the display quality may be degraded and electronic devices may give out due to overheating. For this reason, the light emitting device 10 includes the thermistor 13. The thermistor 13 has a function of varying the electrical resistance value thereof by temperature change. The light emitting device 10 lets the electrical signal of the substrate 11 change by the variation in the electrical resistance value of the thermistor 13 and detects the temperature change of the LEDs 12. When the rise in temperature of the LEDs 12 is high, the light emitting device 10 lowers the luminance of the LEDs 12 so as to suppress the rise in temperature of the liquid crystal panel 101, for example. That is, the thermistor 13 has a function of derating the light emitting device 10 (making it operate at a rated value or less) with respect to the temperature.

Figure 6:
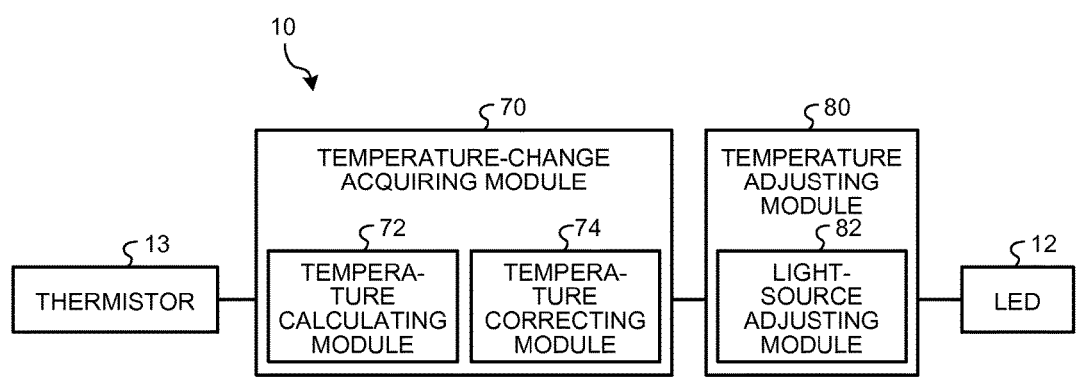
FIG. 6 is a block diagram illustrating the function of temperature control performed by the light emitting device in the first embodiment.

FIG. 6 is a block diagram illustrating the function of temperature control performed by the light emitting device 10 in the first embodiment. As illustrated in FIG. 6, the light emitting device 10 may include a temperature-change acquiring module 70 and a temperature adjusting module 80. The light emitting device 10 adjusts the temperature of the light emitting device 10 with the thermistor 13, the temperature-change acquiring module 70, the temperature adjusting module 80, and the LEDs 12.

The temperature-change acquiring module 70 is electrically coupled to the thermistor 13. The temperature-change acquiring module 70 detects temperature changes of the LEDs 12 based on the variations in electrical resistance value of the thermistor 13. In other words, the temperature-change acquiring module 70 detects variations in the electrical resistance value of the thermistor 13 or an electrical signal that is based on the variations in the electrical resistance value of the thermistor 13. The temperature-change acquiring module 70 then detects the amount of change in temperature of the LEDs 12 corresponding to the variation of the electrical resistance value of the thermistor 13. The temperature-change acquiring module 70 is electrically coupled to the temperature adjusting module 80. The temperature-change acquiring module 70 outputs the amount of change in temperature of the LEDs 12 to the temperature adjusting module 80 as an electrical signal.

The temperature adjusting module 80 adjusts the temperature of the light emitting device 10 based on the amount of change in temperature acquired by the temperature-change acquiring module 70. In the first embodiment, the temperature adjusting module 80 is electrically coupled to the LEDs 12. The temperature adjusting module 80 outputs to the LEDs 12 an electrical signal that adjusts the luminance, lighting time, or others based on the amount of change in temperature of the LEDs 12 output from the temperature-change acquiring module 70. The luminance, lighting time, or others of the LEDs 12 is adjusted based on the electrical signal of the temperature adjusting module 80.

In more detail, the temperature adjusting module 80 in the first embodiment includes a light-source adjusting module 82. The light-source adjusting module 82 adjusts the luminance, lighting time, or others of the LEDs 12 based on the amount of change in temperature of the LEDs 12 acquired by the temperature-change acquiring module 70. For example, the light-source adjusting module 82 calculates the amount of reduction in the luminance, lighting time, or others of the LEDs 12 in response to the increased amount of change in temperature. The temperature adjusting module 80 reduces the luminance, lighting time, or others of the LEDs 12 based on the amount of reduction in the luminance, lighting time, or others of the LEDs 12 calculated by the light-source adjusting module 82. If the luminance, lighting time, or others of the LEDs 12 is reduced, the radiant heat of the LEDs 12 is reduced and whereby the temperature of the light emitting device 10 is lowered. In the first embodiment, the temperature of the light emitting device 10 is adjusted in this manner. The method of adjusting the temperature of the light emitting device 10 by the temperature adjusting module 80, however, is not limited to the adjusting of the luminance or the like of the LEDs 12. For example, the temperature adjusting module 80 may be electrically coupled to a cooling module such as a cooling fan. By outputting an electrical signal to the cooling module by the temperature adjusting module 80, the temperature of the light emitting device 10 may be adjusted by being cooled down by the cooling module.

The temperature-change acquiring module 70 may further include a temperature calculating module 72. The temperature calculating module 72 calculates the temperature of the light emitting device 10 at the location where the thermistor 13 is installed, from the variations in electrical resistance value of the thermistor 13 or the changes in the electrical signal based on the variations in electrical resistance value thereof. The temperature calculating module 72 acquires the temperature of the location at which the thermistor 13 of the light emitting device 10 is placed, based on a correspondence table of the electrical resistance value of the thermistor 13 or the current and voltage thereof and the temperature, or based on an arithmetic expression. If the temperature-change acquiring module 70 can acquire the value of temperature of the location at which the thermistor 13 is placed, by the temperature calculating module 72, in addition to the amount of change in temperature of the LEDs 12, the temperature of the light emitting device 10 can be adjusted more preferably. For example, there may be a case in which the temperature itself is low to the extent of not affecting the degradation of the display quality and others even if the amount of change in temperature is high. In such a case, the temperature adjusting module 80 can perform not to reduce the luminance and others of the LEDs 12, or can make the amount of reduction small.

The temperature-change acquiring module 70 may further include a temperature correcting module 74. The temperature correcting module 74 corrects the value of temperature calculated by the temperature calculating module 72 based on the distance between the thermistor 13 and the LEDs 12. The temperature correcting module 74 corrects the value of temperature of the location at which the thermistor 13 is placed, which is calculated by the temperature calculating module 72, into the value of temperature of the LEDs 12. The thermistor 13 is placed at the location adjacent to the LEDs 12. Consequently, the thermistor 13 is to detect not the temperature of the LEDs 12 themselves but the amount of change in temperature of the LEDs 12. The temperature-change acquiring module 70 can detect the temperature of the LEDs 12 themselves with the temperature correcting module 74. The light emitting device 10 can detect the temperature of the LEDs 12 themselves by the temperature correcting module 74, and whereby the degradation of the LEDs 12 by high temperature can be suppressed more preferably, for example. While the light emitting device 10 includes the temperature-change acquiring module 70 and the temperature adjusting module 80 in the first embodiment, the image display device 100 may include the temperature-change acquiring module 70 and the temperature adjusting module 80, for example. Next, the lifting of the thermistor 13 will be described.

Figure 7:
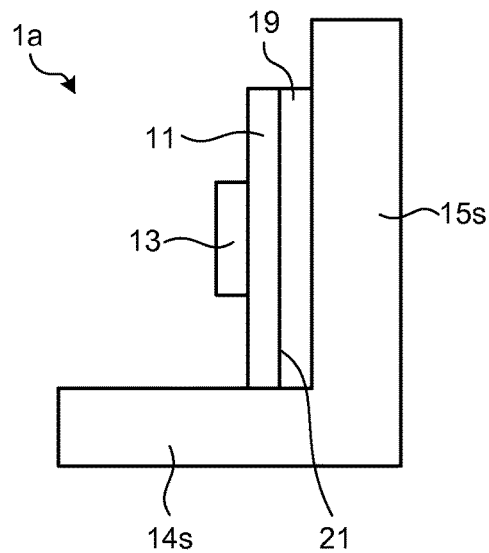
FIG. 7 is a cross-sectional view of a base according to a comparative example.
Figure 8:
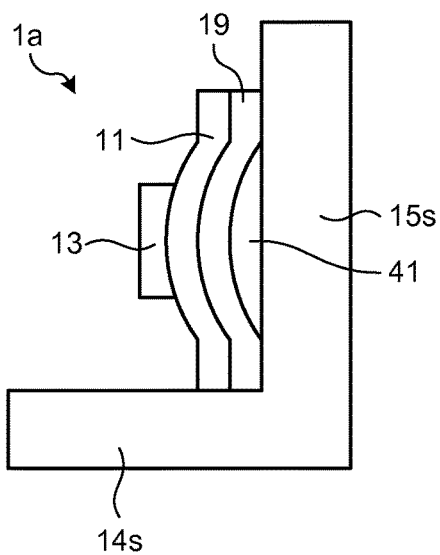
FIG. 8 is a cross-sectional view of the base in the comparative example.
Figure 9:
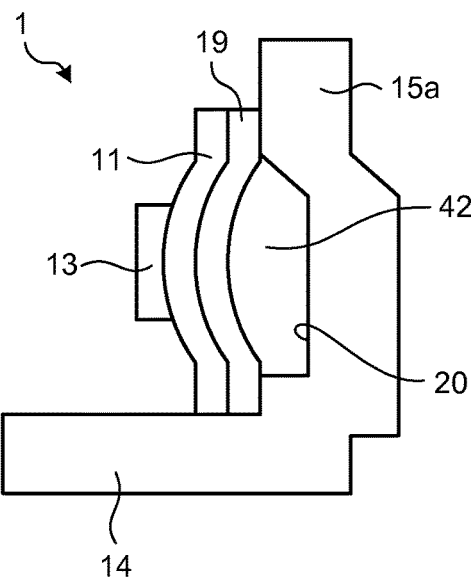
FIG. 9 is a cross-sectional view of the base in the first embodiment.

FIG. 7 is a cross-sectional view of a base 1a according to a comparative example. FIG. 8 is a cross-sectional view of the base 1a in the comparative example. FIG. 9 is a cross-sectional view of the base 1 in the first embodiment. As illustrated in FIG. 7, the base 1a in the comparative example includes a bottom portion 14s and a sidewall portion 15s. The base 1a is different from the base 1 in the first embodiment, and does not include the recessed portion 20. Consequently, the base 1a in the comparative example does not have a space between the sidewall portion 15s and a portion of the substrate 11 on the back surface 21 and opposite to the thermistor 13. In the comparative example, the thermistor 13 is in contact with the sidewall portion 15s with the substrate 11 and the bonding portion 19 therebetween.

The substrate 11 is attached to the sidewall portion 15s with the bonding portion 19 therebetween. Due to the passage of time and changes in temperature, there may be a case in which the adhesive power of the bonding portion 19 weakens and a part of the substrate 11 comes off from the sidewall portion 15s. When the portion of the substrate 11 at which the thermistor 13 is mounted comes off from the sidewall portion 15s, the thermistor 13 is lifted from the sidewall portion 15s. FIG. 8 illustrates a state of the thermistor 13 being lifted from the sidewall portion 15s in the comparative example. As illustrated in FIG. 8, when the thermistor 13 is lifted from the sidewall portion 15s, a space 41 is formed between the thermistor 13 and the sidewall portion 15s. When the space 41 is formed between the thermistor 13 and the sidewall portion 15s, the thermistor 13 is no longer in contact with the sidewall portion 15s, and whereby the resistance value of the thermistor is changed and the thermistor 13 is no longer able to detect the changes in temperature of the LEDs 12 correctly.

Meanwhile, in the first embodiment, as illustrated in FIG. 3, the first sidewall portion 15a includes the recessed portion 20. Consequently, in the first embodiment, even when the thermistor 13 is not lifted from the first sidewall portion 15a, the space 42 is formed between the first sidewall portion 15a and the portion of the substrate 11 on the back surface 21 and opposite to the thermistor 13. In other words, even when the thermistor 13 is not lifted from the first sidewall portion 15a, the thermistor 13 is not in contact with the first sidewall portion 15a. Consequently, as illustrated in FIG. 9, because the light emitting device 10 in the first embodiment includes the space 42 from the beginning, the change in resistance value of the thermistor 13 is smaller than that of the comparative example even when the thermistor 13 is lifted from the first sidewall portion 15a. Thus, in the first embodiment, the thermistor 13 is able to detect the changes in temperature of the LEDs 12 correctly even when the thermistor 13 is lifted from the first sidewall portion 15a, and whereby it is suppressed that the thermistor 13 is unable to derate the light emitting device 10 appropriately with respect to the temperature. Furthermore, without controlling the lifting of the thermistor 13 by the process control, the yield is improved. Thus, in the first embodiment, the yield is improved with a simple process control in the production of the light emitting device 10, and therefore the process control can be simplified. Next, on the changes in resistance value when the thermistor 13 is lifted, the evaluation result of comparison between the first embodiment and the comparative example will be described.

Evaluation

Figure 10:
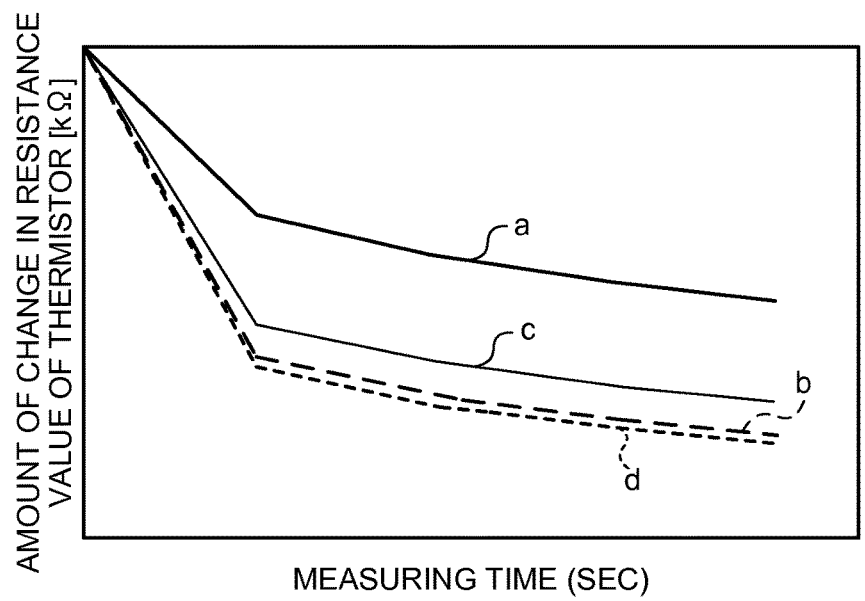
FIG. 10 is a chart illustrating changes in resistance value when a thermistor is lifted.

FIG. 10 is a chart illustrating the changes in resistance value when the thermistor 13 is lifted. FIG. 10 is a chart in which the comparative example and the first embodiment are compared by measuring the changes in the resistance value of the thermistor 13 when the thermistor 13 is lifted. The abscissa axis of FIG. 10 represents the measuring time and the ordinate axis thereof represents the amount of change in resistance value of the thermistor 13. As the measuring time becomes longer, the lighting time of the LEDs 12 becomes longer, and whereby the temperature of the LEDs 12 tends to rise and the resistance value of the thermistor 13 tends to be lowered. The line segment a in FIG. 10 represents the amount of change in the resistance value of the thermistor 13 in the comparative example when the thermistor 13 is not lifted. The line segment b in FIG. 10 represents the amount of change in the resistance value of the thermistor 13 in the comparative example when the thermistor 13 is lifted. The line segment c in FIG. 10 represents the amount of change in the resistance value of the thermistor 13 in the first embodiment when the thermistor 13 is not lifted. The line segment d in FIG. 10 represents the amount of change in the resistance value of the thermistor 13 in the first embodiment when the thermistor 13 is lifted. As represented by the line segment a and the line segment b, in the comparative example, the resistance value of the thermistor 13 in the same measuring time is drastically decreased when the lifting of the thermistor 13 arises. As represented by the line segment c and the line segment d, in the first embodiment, the resistance value of the thermistor 13 is not decreased drastically even when the lifting of the thermistor 13 arises. Thus, in the first embodiment, because there is the space 42 present from the beginning, the change in the resistance value of the thermistor 13 attributable to the lifting is kept small even when the lifting of the thermistor 13 arises, and thereby the thermistor 13 can detect the changes in temperature of the LEDs 12 correctly. As the cubic volume of the space 42 is larger while the thermistor 13 is not lifted, the amount of lowering in the resistance value of the thermistor 13 at the time the lifting of the thermistor 13 arises is smaller. As the distance between the thermistor 13 and the first sidewall portion 15a of the base 1 is larger, the amount of lowering in the resistance value of the thermistor 13 at the time the lifting of the thermistor 13 arises is smaller. As the thermal conductivity of the base 1 is smaller, the amount of lowering in the resistance value of the thermistor 13 at the time the lifting of the thermistor 13 arises is smaller.

Thus, the light emitting device 10 and the image display device 100 in the first embodiment are provided with the space 42 between the thermistor 13 and the first sidewall portion 15a of the base 1 from the beginning, and thereby the amount of change in detection value of the thermistor 13 at the time the lifting of the thermistor 13 arises can be suppressed and the changes in temperature of the LEDs 12 can be detected correctly. As described above, the base 1 is provided with the projecting portion 17a to secure the bezel 102 to the base 1. The projecting portion 17a is provided at a portion on the outer surface 16a of the first sidewall portion 15a and opposite to another portion in which the recessed portion 20 is provided. Consequently, when the base 1 is formed by pressing process, the projecting portion 17a and the recessed portion 20 can be formed by a single press, and thus the forming step of the base 1 can be reduced, for example.

While the present embodiment is configured that all the sidewall portions of the frame body 15 (the first sidewall portion 15a, the second sidewall portion 15b, the third sidewall portion 15c, and the forth sidewall portion 15d) are provided with the projecting portions 17a, 17b, 17c, and 17d, respectively, and the frame wall portion 114 of the bezel 102 is provided with a plurality of recessed portions 113, it is not limited to this. For example, only one of the sidewall portions of the frame body 15 may be provided with a projecting portion, and the frame wall portion 114 may be provided with a recessed portion 113.

2. Second Embodiment

Figure 11:
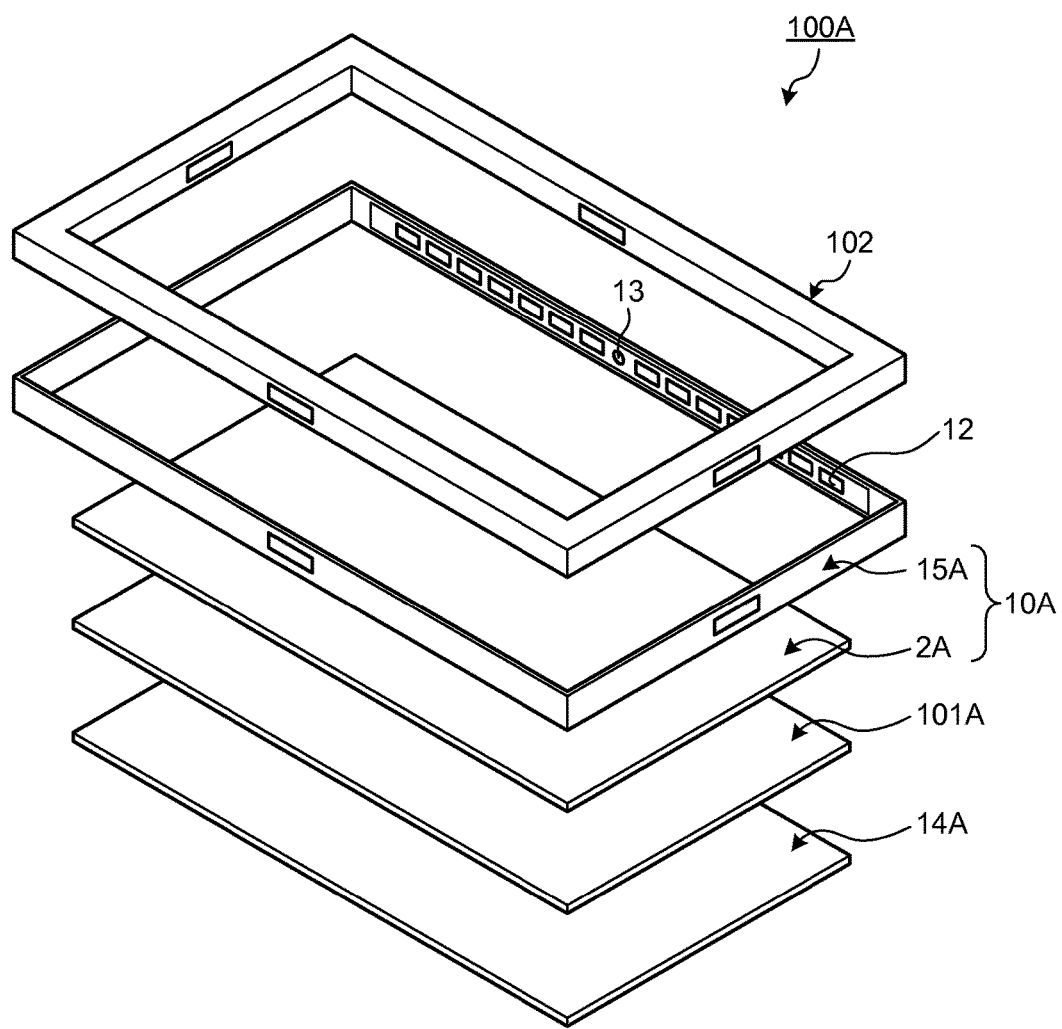
FIG. 11 is an exploded perspective view schematically illustrating the configuration of an image display device according to a second embodiment.
Figure 12:
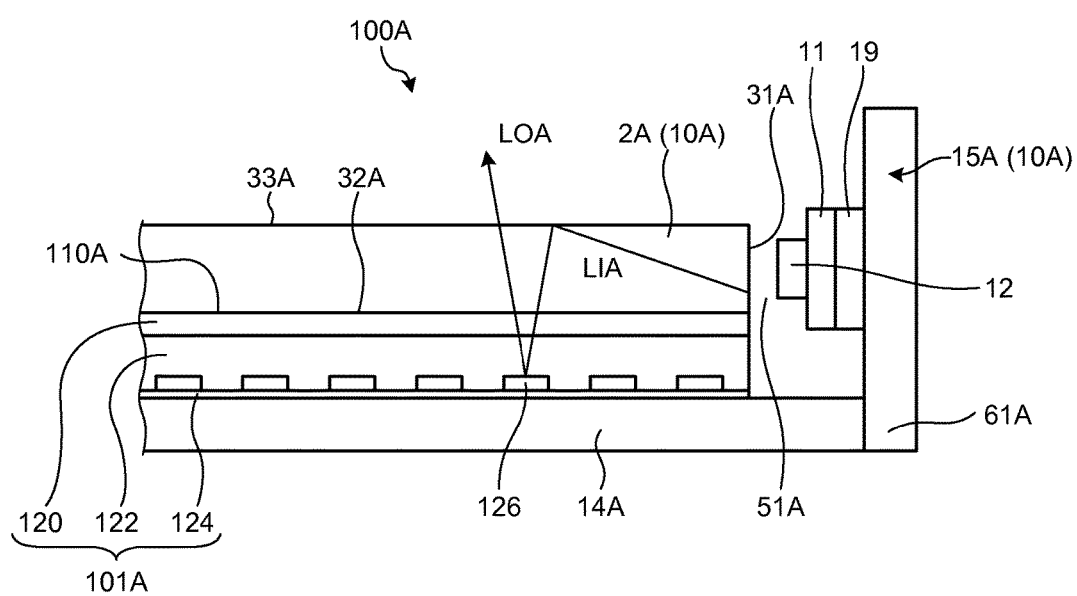
FIG. 12 is a cross-sectional view of a relevant portion of the image display device in the second embodiment.

With reference to the accompanying drawings, a second embodiment will be described. FIG. 11 is an exploded perspective view schematically illustrating the configuration of an image display device 100A according to the second embodiment. FIG. 12 is a cross-sectional view of a relevant portion of the image display device 100A in the second embodiment. The image display device 100A and a light emitting device 10A in the second embodiment are of a front light type and of an edge light type. The other elements are the same as those in the first embodiment, and thus the explanations thereof are omitted.

As illustrated in FIG. 11, the image display device 100A in the second embodiment includes a bottom portion 14A, a liquid crystal panel 101A, the light emitting device 10A that includes a light guide plate 2A and a frame body 15A serving as a base, and the bezel 102. As illustrated in FIG. 12, the light emitting device 10A houses the light guide plate 2A in a space 51A inside the frame body 15A. The image display device 100A is configured as follows. That is, the bottom portion 14A is attached to an end portion 61A on one side of the frame body 15A of the light emitting device 10A. The liquid crystal panel 101A, the light guide plate 2A, and the bezel 102 are provided from the bottom portion 14A in this order. A glass panel or the like may be provided between the light guide plate 2A and the bezel 102.

In the second embodiment, the bottom portion 14A is manufactured as a separate piece from the frame body 15A that serves as the base. Thus, the bottom portion 14A is attached to the frame body 15A so as to cover the end portion 61A on one side of the frame body 15A. The liquid crystal panel 101A is a liquid crystal panel of reflective type. As illustrated in FIG. 12, the liquid crystal panel 101A includes a counter substrate 120, a liquid crystal layer 122, and an array substrate 124 in this order from an image display surface 110A, for example. Pixel electrodes 126 are provided on the array substrate 124. The bezel 102 is put on the frame body 15A and secured, in the same manner as the first embodiment. When the bezel 102 is secured onto the frame body 15A, the light guide plate 2A and the liquid crystal panel 101A are secured to each other, thereby forming the image display device 100A. Next, the irradiation of the liquid crystal panel 101A with light by the light emitting device 10A in the second embodiment will be described.

FIG. 12 illustrates the method of irradiating the liquid crystal panel 101A with light by the light emitting device 10A. As illustrated in FIG. 12, the LEDs 12 let light LIA enter the light guide plate 2A from a lateral surface 31A of the light guide plate 2A. In the light guide plate 2A, a prism process has been applied on a reflecting surface 33A that is the surface on the opposite side of the liquid crystal panel 101A, for example. The light LIA that enters the light guide plate 2A is reflected by the reflecting surface 33A, and is headed toward a light emitting surface 32A that is the surface on the liquid crystal panel 101A side of the light guide plate 2A. The light LIA that is heading toward the light emitting surface 32A enters the liquid crystal layer 122 inside the liquid crystal panel 101A from the image display surface 110A of the liquid crystal panel 101A. The light LIA that enters the liquid crystal layer 122 inside the liquid crystal panel 101A is reflected by the pixel electrodes 126. The light LIA reflected by the pixel electrodes 126 is emitted to the outside of the image display device 100A via the liquid crystal panel 101A and the light guide plate 2A as light LOA.

Thus, the image display device 100A and the light emitting device 10A in the second embodiment are of a front light type and of an edge light type. The light irradiation method by the light emitting device 10A in the second embodiment is not limited to this, as long as it is of a front light type and of an edge light type. For example, it may be configured such that the LEDs 12 emit light to a reflective plate provided in a light emitting device and the light reflected from the reflective plate enters a light guide plate from the reflecting surface 33A side of the light guide plate.

The light emitting device 10A in the second embodiment is provided with the space 42 between the thermistor 13 and the first sidewall portion 15a of the frame body 15A from the beginning, in the same manner as the first embodiment. Consequently, also in the second embodiment, the light emitting device 10A can suppress the amount of change in detection value of the thermistor 13 when the lifting of the thermistor 13 arises, and thus can detect the changes in temperature of the LEDs 12 correctly.

3. Third Embodiment

Figure 13:
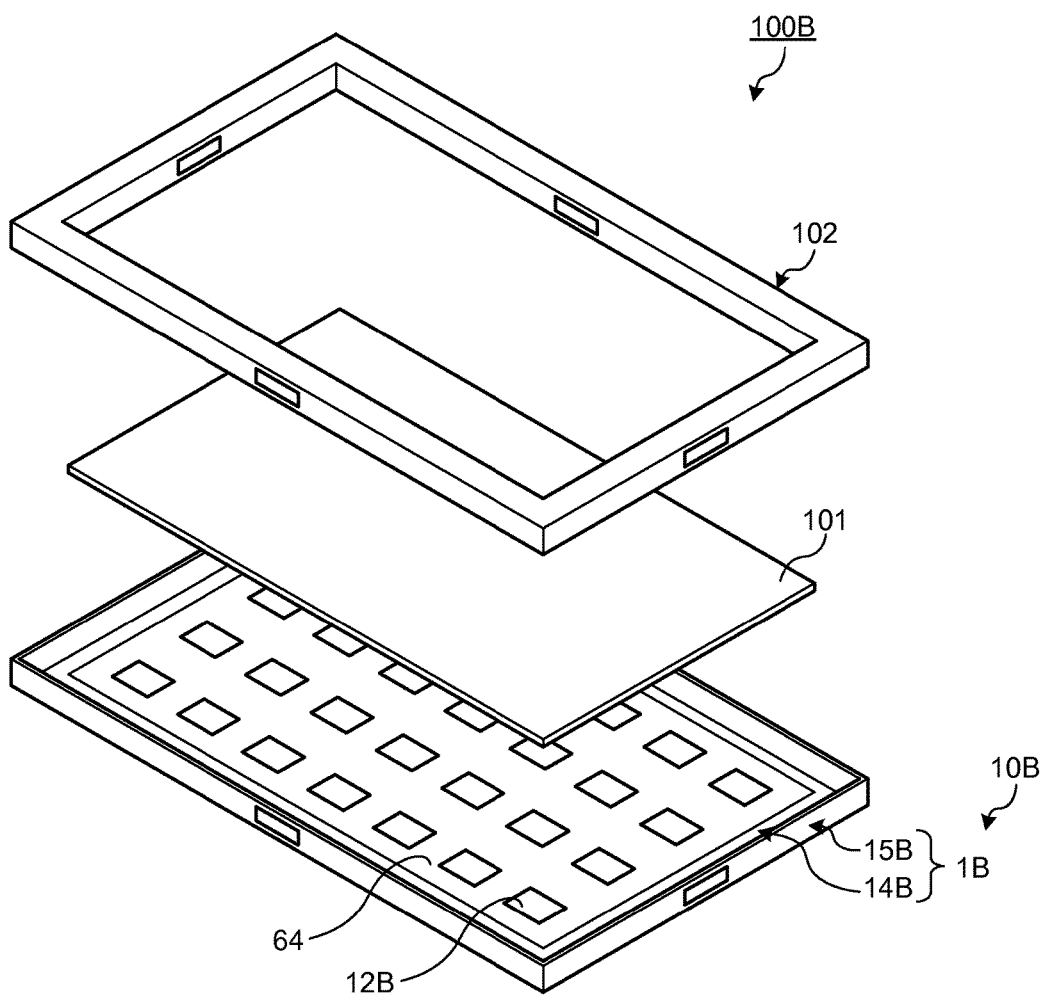
FIG. 13 is an exploded perspective view schematically illustrating the configuration of an image display device according to a third embodiment.
Figure 14:
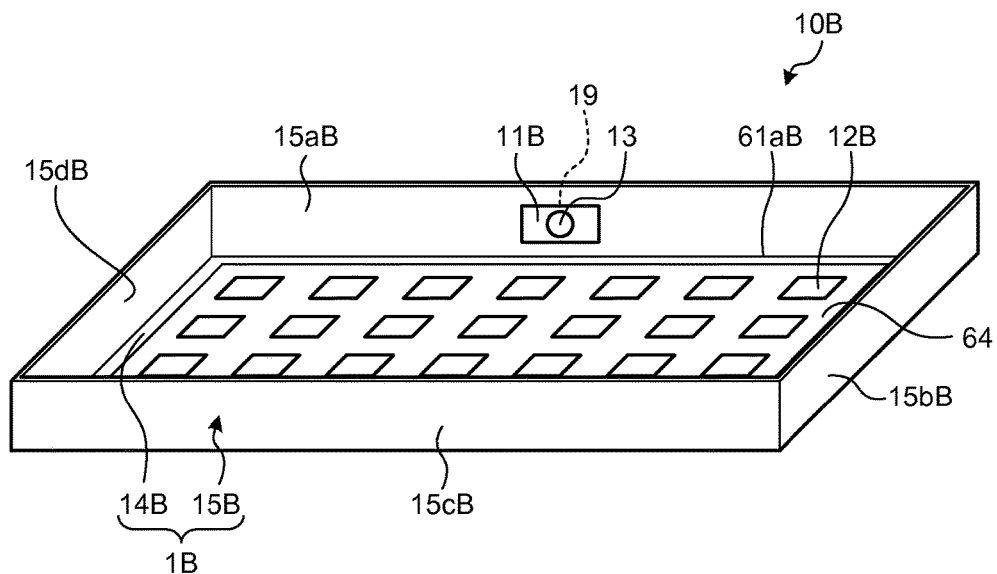
FIG. 14 is a perspective view of a light emitting device in the third embodiment.
Figure 15:
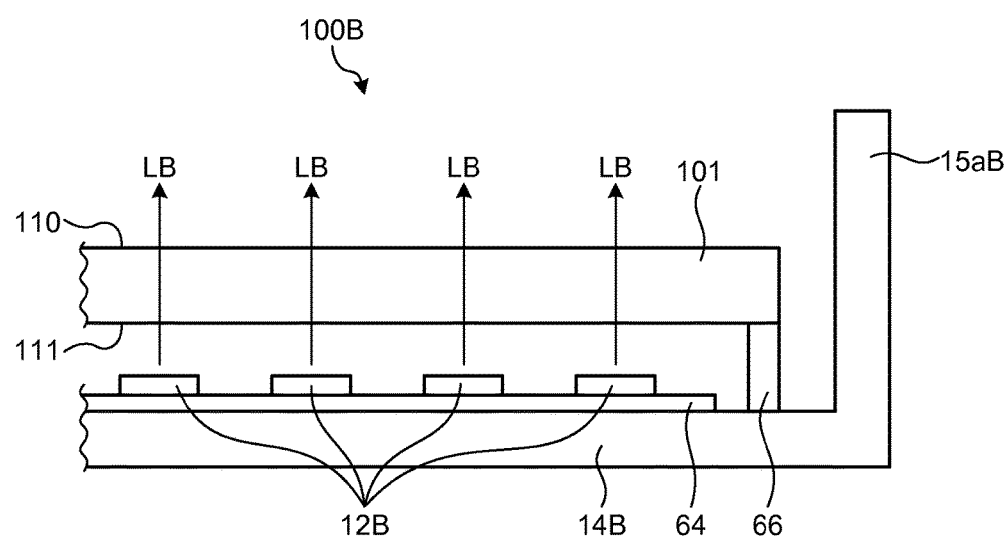
FIG. 15 is a cross-sectional view of a relevant portion of the image display device in the third embodiment.

With reference to the accompanying drawings, a third embodiment will be described. FIG. 13 is an exploded perspective view schematically illustrating the configuration of an image display device 100B according to the third embodiment. FIG. 14 is a perspective view of a light emitting device 10B in the third embodiment. FIG. 15 is a cross-sectional view of a relevant portion of the image display device 100B in the third embodiment. The image display device 100B and the light emitting device 10B in the third embodiment are of a backlight type and of a direct-type. The other elements are the same as those in the first embodiment, and thus the explanations thereof are omitted.

As illustrated in FIG. 13, the image display device 100B in the third embodiment includes the light emitting device 10B, which includes a base 1B, and the liquid crystal panel 101 and the bezel 102. The image display device 100B is configured as follows. That is, the liquid crystal panel 101 is housed inside a frame body 15B of the base 1B of the light emitting device 10B. The bezel 102 is put on the frame body 15B and secured. As illustrated in FIG. 15, the liquid crystal panel 101 may be supported by a support base 66 inside the frame body 15B. The liquid crystal panel 101, by being supported by the support base 66, does not come in contact with later described LEDs 12B inside the frame body 15B.

As illustrated in FIG. 14, the base 1B includes the frame body 15B and a bottom portion 14B, in the same manner as the base 1 in the first embodiment. The frame body 15B includes a first sidewall portion 15aB, a second sidewall portion 15bB, a third sidewall portion 15cB, and a fourth sidewall portion 15dB, in the same manner as the frame body 15 in the first embodiment.

The bottom portion 14B is provided with a first substrate 64. A plurality of LEDs 12B are mounted to the first substrate 64. In the third embodiment, the LEDs 12B are provided over the entire surface of the bottom portion 14B with the first substrate 64 therebetween. However, the arrangement of the LEDs 12B is selected as appropriate. For example, the LEDs 12B may be arranged to be equally spaced apart from one another. The LEDs 12B may be provided in an area in which a part of the entire surface of the bottom portion 14B is lacking. The number of LEDs 12B is not particularly limited, and is selected as appropriate.

As illustrated in FIG. 14, the first sidewall portion 15aB is provided with a second substrate 11B, and the bonding portion 19 is provided between the first sidewall portion 15aB and the second substrate 11B. The thermistor 13 serving as a temperature sensor is mounted to the second substrate 11B. The thermistor 13 is provided adjacent to the LEDs 12B with an end portion 61aB on one side of the first sidewall portion 15aB therebetween. A plurality of thermistors 13 may be provided. The first sidewall portion 15aB is provided with the second substrate 11B and the thermistor 13, but not limited thereto. Any one of the second sidewall portion 15bB, the third sidewall portion 15cB, and the fourth sidewall portion 15dB may be provided with the second substrate 11B and the thermistor 13. A plurality of sidewall portions out of the first sidewall portion 15aB, the second sidewall portion 15bB, the third sidewall portion 15cB, and the fourth sidewall portion 15dB may be provided with the second substrate 11B and the thermistor 13. The bottom portion 14B may be provided with the second substrate 11B and the thermistor 13. In this case, the second substrate 11B may be integrated with the first substrate 64, or may be a separate piece.

As illustrated in FIG. 15, light LB emitted from the LEDs 12B enters the liquid crystal panel 101 from the back surface 111, is transmitted through the liquid crystal panel 101, and is emitted from the image display surface 110 of the liquid crystal panel 101. Thus, the image display device 100B and the light emitting device 10B in the third embodiment are of a backlight type and of a direct-type.

The light emitting device 10B in the third embodiment is provided with the space 42 between the thermistor 13 and the first sidewall portion 15aB of the frame body 15B from the beginning, in the same manner as the first embodiment. Consequently, also in the third embodiment, the light emitting device 10B can suppress the amount of change in detection value of the thermistor 13 at the time the lifting of the thermistor 13 arises, and thus the light emitting device 10B can detect the changes in temperature of the LEDs 12B correctly.

In the third embodiment, the bottom portion 14B is provided as a separate piece from the first substrate 64, but is not limited to this. The bottom portion 14B may be integrated with the first substrate 64 and provided with the LEDs 12B.

4. Fourth Embodiment

Figure 16:
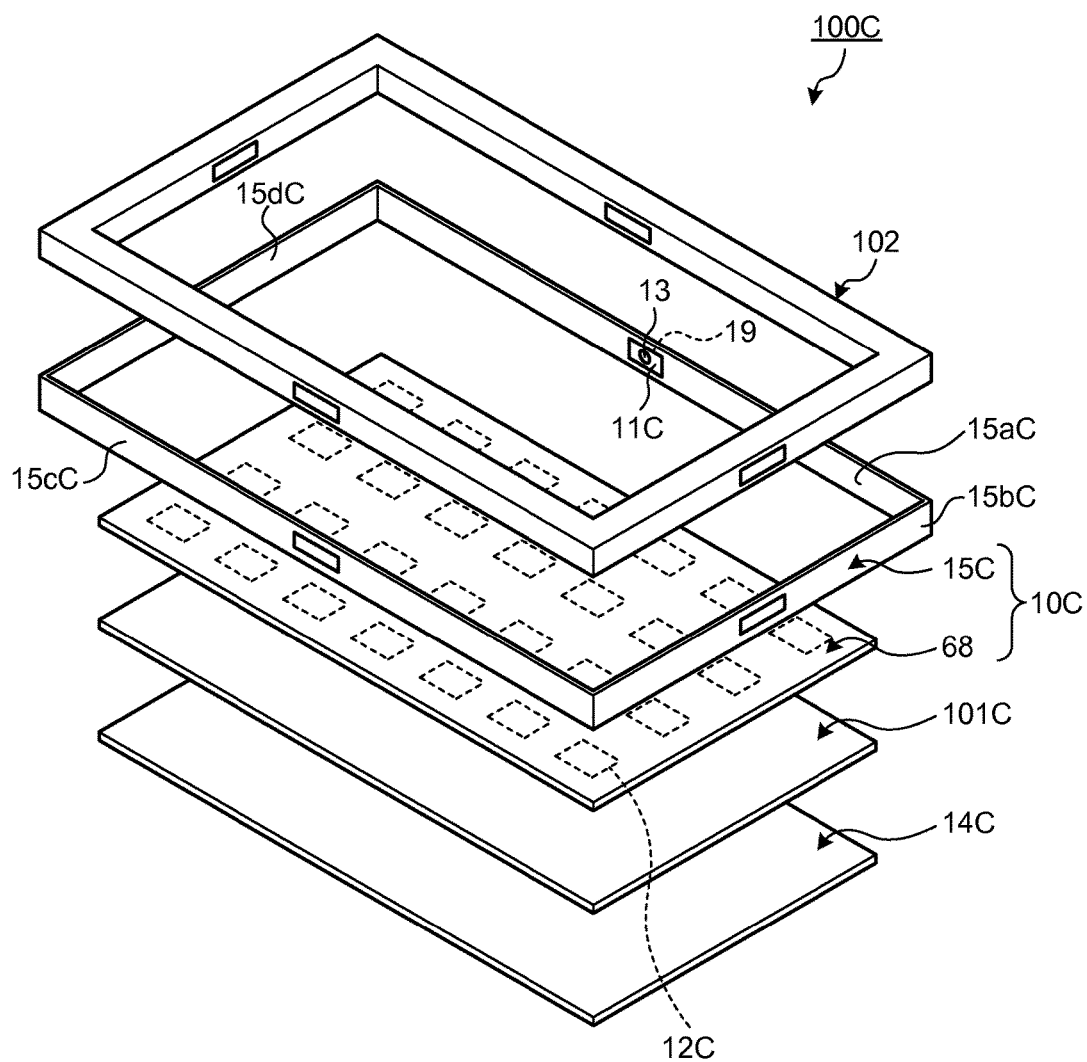
FIG. 16 is an exploded perspective view schematically illustrating the configuration of an image display device according to a fourth embodiment.
Figure 17:
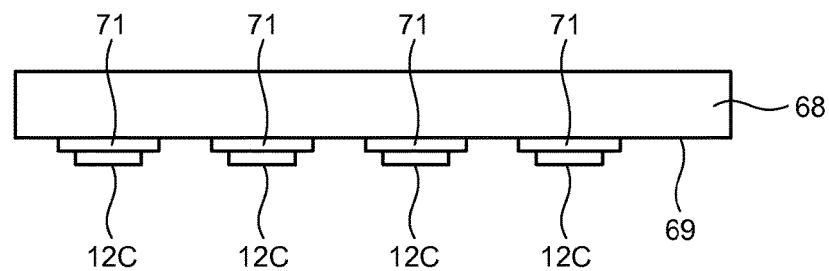
FIG. 17 is a side view of a first substrate in the fourth embodiment.
Figure 18:
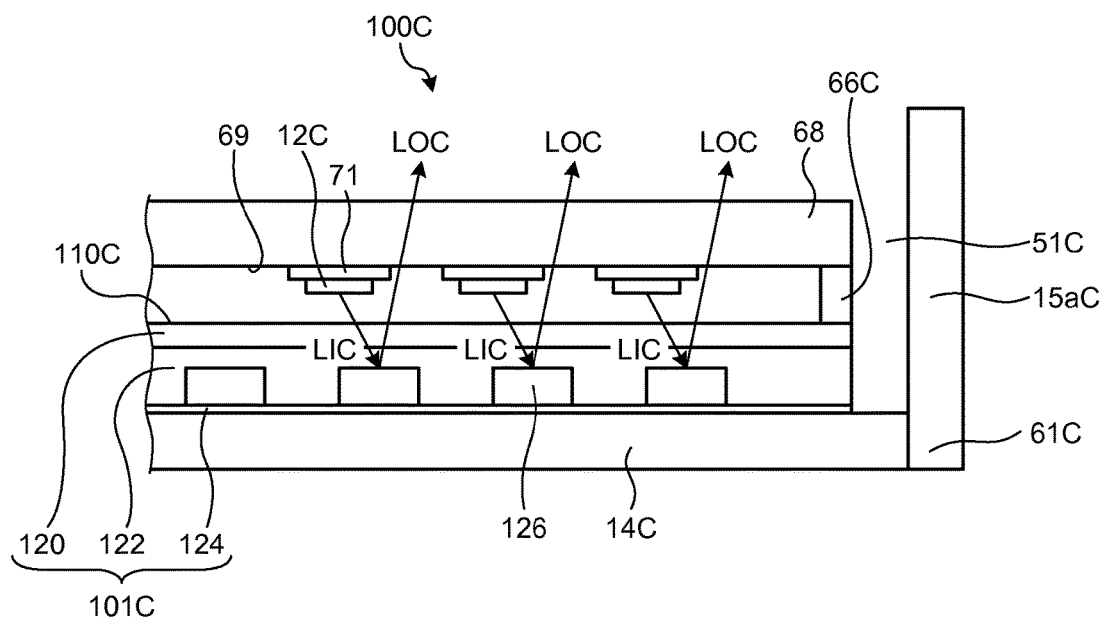
FIG. 18 is a cross-sectional view of a relevant portion of the image display device in the fourth embodiment.

With reference to the accompanying drawings, a fourth embodiment will be described. FIG. 16 is an exploded perspective view schematically illustrating the configuration of an image display device 100C according to the fourth embodiment. FIG. 17 is a side view of a first substrate 68 in the fourth embodiment. FIG. 18 is a cross-sectional view of a relevant portion of the image display device 100C in the fourth embodiment. The image display device 100C and a light emitting device 10C in the fourth embodiment are of a front light type and of a direct-type. The other elements are the same as those in the second embodiment, and thus the explanations thereof are omitted.

As illustrated in FIG. 16, the image display device 100C in the fourth embodiment includes a bottom portion 14C, a liquid crystal panel 101C, the light emitting device 10C that includes the first substrate 68 and a frame body 15C serving as a base, and the bezel 102. The light emitting device 10C houses the first substrate 68 in a space 51C inside the frame body 15C. The image display device 100C is configured as follows. That is, the bottom portion 14C is attached to an end portion 61C on one side of the frame body 15C of the light emitting device 10C. The liquid crystal panel 101C, the first substrate 68, and the bezel 102 are provided from the bottom portion 14C in this order. A glass panel or the like may be provided between the first substrate 68 and the bezel 102. As illustrated in FIG. 18, the first substrate 68 may be supported by a support base 66C inside the frame body 15C. By the first substrate 68 being supported by the support base 66C, later described LEDs 12C mounted to the first substrate 68 do not come in contact with the liquid crystal panel 101C.

In the fourth embodiment, the first substrate 68 is a transparent substrate. While the first substrate 68 is manufactured by using glass or plastic material such as PMMA, for example, it is not limited to those as long as it has translucency. As illustrated in FIGS. 17 and 18, a plurality of LEDs 12C are mounted to a lower surface 69 that is the surface on one side of the first substrate 68 and is the surface on the liquid crystal panel 101C side. The LEDs 12C may be coupled to metal wiring or to wiring including translucent electrical conducting material, for example.

In the fourth embodiment, the LEDs 12C are provided over the entire surface of the first substrate 68. However, the arrangement of the LEDs 12C is selected as appropriate. For example, the LEDs 12C may be arranged to be equally spaced apart from one another. The LEDs 12C may be provided in an area in which a part of the entire surface of the first substrate 68 is lacking. The number of LEDs 12C is not particularly limited, and is selected as appropriate. As illustrated in FIG. 17, light blocking portions 71 may be provided between the LEDs 12 and the first substrate 68. The light blocking portions 71 suppress the light from the LEDs 12C to pass through the first substrate 68 and to be emitted directly to the outside. Reflective plates may be provided in place of the light blocking portions 71.

In the fourth embodiment, the bottom portion 14C is manufactured as a separate piece from the frame body 15C that serves as the base. Thus, the bottom portion 14C is attached to the frame body 15C so as to cover the end portion 61C on one side of the frame body 15C.

As illustrated in FIG. 16, the frame body 15C includes a first sidewall portion 15aC, a second sidewall portion 15bC, a third sidewall portion 15cC, and a fourth sidewall portion 15dC, in the same manner as the frame body 15 in the first embodiment. The first sidewall portion 15aC is provided with a second substrate 11C, and the bonding portion 19 is provided between the first sidewall portion 15aC and the second substrate 11C. The second substrate 11C is provided with the thermistor 13 serving as a temperature sensor. The thermistor 13 is placed adjacent to the LEDs 12C on the first substrate 68. A plurality of thermistors 13 may be provided. The first sidewall portion 15aC is provided with the second substrate 11C and the thermistor 13, but not limited thereto. Any one of the second sidewall portion 15bC, the third sidewall portion 15cC, and the fourth sidewall portion 15dC may be provided with the second substrate 11C and the thermistor 13. A plurality of sidewall portions out of the first sidewall portion 15aC, the second sidewall portion 15bC, the third sidewall portion 15cC, and the fourth sidewall portion 15dC may be provided with the second substrate 11C and the thermistor 13. The first substrate 68 and the second substrate 11C may be integrally formed.

The liquid crystal panel 101C is a liquid crystal panel of reflective type, in the same manner as the liquid crystal panel 101A in the second embodiment. The bezel 102 is put on the frame body 15C and secured, in the same manner as the second embodiment. When the bezel 102 is secured onto the frame body 15C, the first substrate 68 and the liquid crystal panel 101C are secured to each other, thereby forming the image display device 100C. Next, the irradiation of the liquid crystal panel 101C with light by the light emitting device 10C in the fourth embodiment will be described.

As illustrated in FIG. 18, the light LIC emitted from the LEDs 12C enters the liquid crystal layer 122 inside the liquid crystal panel 101C from the image display surface 110C of the liquid crystal panel 101C. The light LIC entered the liquid crystal layer 122 inside the liquid crystal panel 101C is reflected by the pixel electrodes 126. The light LIC reflected by the pixel electrodes 126 is emitted to the outside of the image display device 100C via the liquid crystal panel 101C and the first substrate 68 as light LOC.

Thus, the image display device 100C and the light emitting device 10C in the fourth embodiment are of a front light type and of a direct-type.

The light emitting device 10C in the fourth embodiment is provided with the space 42 between the thermistor 13 and the first sidewall portion 15aC of the frame body 15C from the beginning, in the same manner as the first embodiment. Consequently, also in the fourth embodiment, the light emitting device 10C can suppress the amount of change in detection value of the thermistor 13 when the lifting of the thermistor 13 arises, and thus the light emitting device 10C can detect the changes in temperature of the LEDs 12C correctly.

As described in the first embodiment to the fourth embodiment, the light emitting device according to the disclosure may be any of a backlight type or a front light type, and of an edge light type or a direct-type. The light emitting device in the disclosure can have the following effect, as long as the device includes a base including at least a frame body, a light source such as an LED, and a temperature sensor such as the thermistor 13 with which the base is provided, and a space is provided between the thermistor 13 and a portion of the base corresponding to a portion in which the thermistor 13 is placed. That is, the light emitting device in the disclosure can suppress the amount of change in detection value of the thermistor 13 when the lifting of the thermistor 13 arises, and thus can detect the changes in temperature of the LED correctly.

5. Modifications

Figure 19:
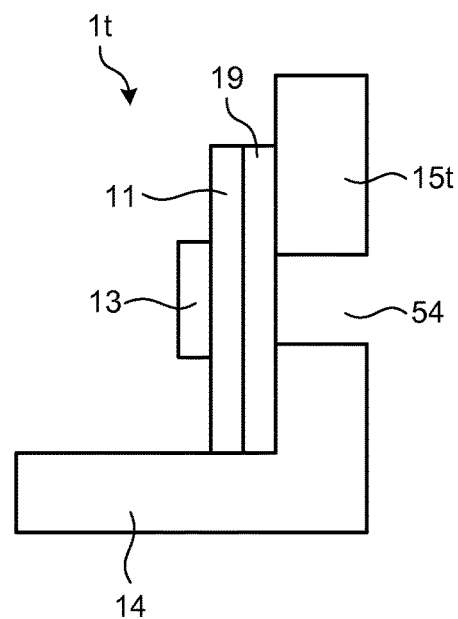
FIG. 19 is a cross-sectional view of a base according to a first modification.
Figure 20:
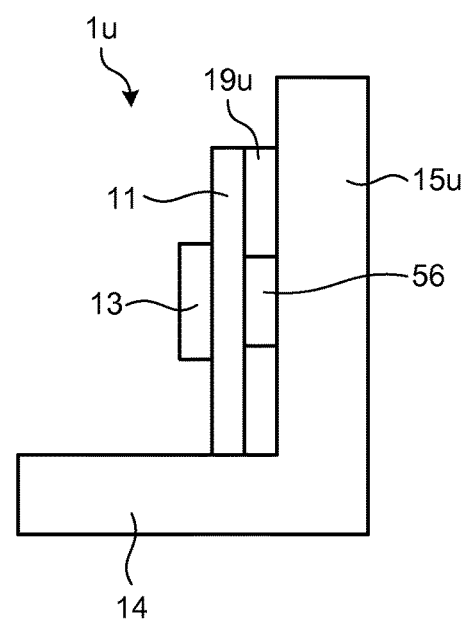
FIG. 20 is a cross-sectional view of a base according to a second modification.

With reference to the accompanying drawings, a first modification and a second modification of the first embodiment will be described. FIG. 19 is a cross-sectional view of a base 1t according to the first modification. FIG. 20 is a cross-sectional view of a base 1u according to the second modification. The difference of the first modification and the second modification from the first embodiment is the following point. That is, in both the first modification and the second modification, although a space is provided between the thermistor and the sidewall portion of the base, the recessed portion 20 is not included. Other configurations are common to those in the first embodiment, and thus the explanations thereof are omitted.

As illustrated in FIG. 19, the base 1t in the first modification is provided with a through-hole 54 in a sidewall portion 15t. The through-hole 54 constitutes a space between the thermistor 13 and the sidewall portion 15t of the base 1t. Consequently, also in the first modification, the detection value of the thermistor 13 is not changed even when the lifting of the thermistor 13 arises in the same manner as the first embodiment, and thus the changes in temperature of the LEDs 12 can be detected correctly.

As illustrated in FIG. 20, the base 1u in the second modification is provided with a through-hole 56 in a bonding portion 19u. The through-hole 56 can be provided by making a through-hole in a double-sided adhesive tape as the bonding portion 19u at a portion facing the thermistor 13 before bonding the bonding portion 19u to the substrate 11, for example. The through-hole 56 constitutes a space between the thermistor 13 and a sidewall portion 15u of the base 1u. Consequently, also in the second modification, the detection value of the thermistor 13 is not changed even when the lifting of the thermistor 13 arises in the same manner as the first embodiment, and thus the changes in temperature of the LEDs 12 can be detected correctly.

Thus, the recessed portion may not be provided on the sidewall portion of the base. For example, the space can also be provided between the thermistor and the sidewall portion of the base by providing a through-hole in the sidewall portion or the bonding portion of the base. By such a structure, the detection value of the thermistor 13 is not changed even when the lifting of the thermistor 13 arises, and thus the changes in temperature of the LEDs 12 can be detected correctly. Consequently, not limited to by the recessed portion, as long as a space is provided between the thermistor and the sidewall portion of the base, the detection value of the thermistor 13 is not changed even when the lifting of the thermistor 13 arises, and thus the changes in temperature of the LEDs 12 can be detected correctly. The first and the second modifications are applicable to the second, the third, and the fourth embodiments. In the second, the third, or the fourth embodiment, as long as a space is provided between the thermistor and the sidewall portion of the base, the detection value of the thermistor 13 is not changed even when the lifting of the thermistor 13 arises, and thus the changes in temperature of the LEDs 12 can be detected correctly.

The present disclosure relates to the thermistor 13 serving as a temperature sensor that detects the changes in temperature of the LEDs 12 serving as a light source. The disclosure, however, can be used for a temperature sensor that detects the changes in temperature of a heating element other than the light source. For example, the disclosure can be used when arranging a temperature sensor for a heating element such as circuits in place of a light source in a display device such as organic light emitting diode (OLED).

In the space 42 described in the first embodiment, a heat insulating member that suppresses heat transfer from the first sidewall portion 15a of the base 1 to the thermistor 13 may be provided. This heat insulating member is a member of a thermal conductivity lower than that of the first sidewall portion 15a of the base 1, for example. In this case, the thermistor 13 is in contact with the sidewall portion of the base 1 with the heat insulating member therebetween. The heat transfer to the thermistor 13 from the first sidewall portion 15a of the base 1 is suppressed by the heat insulating member. Consequently, in this case, even when the lifting arises on the thermistor 13, the change in the amount of heat transfer is suppressed and the detection value of the thermistor 13 is not changed, and thus the changes in temperature of the LEDs 12 can be detected correctly. However, with respect to the space 42, the one that includes an air layer enables the changes in temperature of the LEDs 12 to be detected more correctly. The heat insulating member may be provided in the space described in the other embodiments and modifications.

Figure 21:
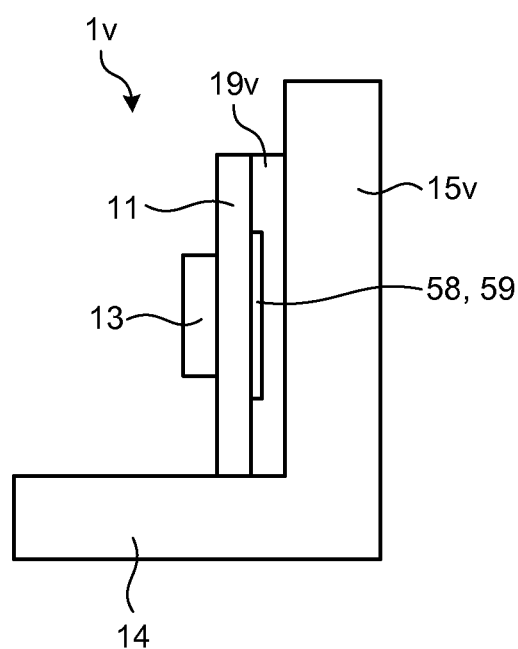
FIG. 21 is a cross-sectional view of a base 1ν when a heat insulating member is provided.

Next, an example provided with a heat insulating member will be described. FIG. 21 is a cross-sectional view of a base 1v in a situation that the heat insulating member is provided. As illustrated in FIG. 21, the base 1v is provided with a heat insulating member 58 between a bonding portion 19v and the substrate 11, and on a portion of the bonding portion 19v facing the thermistor 13. The heat insulating member 58 is a member that suppresses the heat transfer from a sidewall portion 15v of the base 1v to the thermistor 13, and includes a member having a thermal conductivity lower than that of the sidewall portion 15v of the base 1v, for example. That is, when the base 1v has a first thermal conductivity that is a given thermal conductivity, the heat insulating member 58 has a second thermal conductivity that is lower than the first thermal conductivity. The thermistor 13 is in contact with the sidewall portion 15v of the base 1v with the heat insulating member 58 therebetween.

In the example illustrated in FIG. 21, the heat insulating member 58 is placed in a space 59 composed of a cavity provided on the substrate 11 side of the bonding portion 19v. In this example, the space 59 is in a state of being completely filled with the heat insulating member 58. In more detail, the heat insulating member 58 is stacked on the bonding portion 19v. The space 59, however, may be in a state of being partially filled with the heat insulating member 58. For example, the heat insulating member 58 may be stacked on the surface of the substrate 11 facing the bonding portion 19v, or may be stacked on the bonding portion 19v. In this case, in the space 59, a space having an air layer is provided between the substrate 11 and the heat insulating member 58, or between the heat insulating member 58 and the bonding portion 19v.

The heat insulating member 58 is not limited to be placed between the bonding portion 19v and the base 1v, as long as it is placed between the thermistor 13 and the sidewall portion 15v of the base 1v. The heat insulating member 58 may be placed between the bonding portion 19v and the sidewall portion 15v of the base 1v, for example. The heat insulating member 58 is not limited to be a member having a thermal conductivity lower than that of the base 1v, as long as it suppresses the heat transfer from the sidewall portion 15v of the base 1v to the thermistor 13. For example, the heat insulating member 58 may be a member that has an empty hole inside.

6. Application Examples

Figure 22:
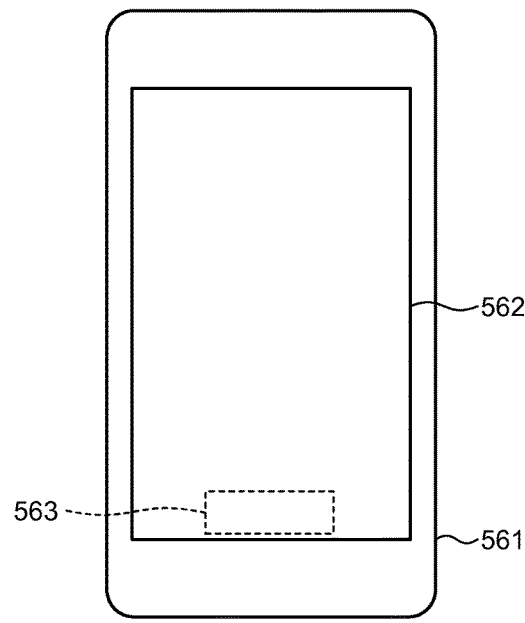
FIG. 22 is a diagram illustrating one example of an electronic apparatus to which the image display device in the embodiments is applied.
Figure 23:
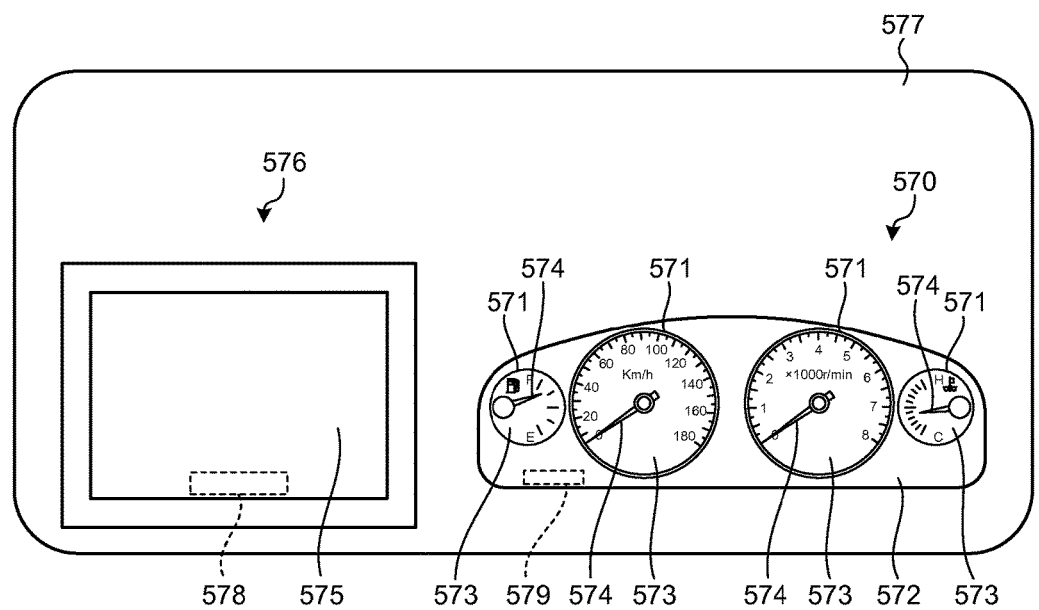
FIG. 23 is a diagram illustrating one example of electronic apparatuses to which the image display device in the embodiments is applied.

With reference to FIGS. 22 and 23, described are the application examples of the image display device described in the first embodiment to the fourth embodiment and in the first and the second modifications. In the following description, the first embodiment to the fourth embodiment and the first and the second modifications are described as the present embodiment. FIGS. 22 and 23 are diagrams illustrating examples of an electronic apparatus to which the image display device in the present embodiment is applied. Other than the examples cited in FIGS. 22 and 23, the image display device in the present embodiment can be applied to electronic apparatuses in every field such as portable terminal devices like cellular phones, smartphones, and tablets; television apparatuses; digital cameras; laptop personal computers; video cameras; and meters or car navigation systems installed in vehicles. In other words, the image display device in the present embodiment is applicable to electronic apparatuses in every field that display an image or a video based on a video signal input from the outside or a video signal generated internally. An electronic apparatus includes a control device that provides a video signal to an image display device and controls the operation of the image display device. While the light emitting device 10 includes the temperature-change acquiring module 70 and the temperature adjusting module 80 in the first embodiment, the electronic apparatus may include the temperature-change acquiring module 70 and the temperature adjusting module 80, for example.

First Application Example

An electronic apparatus illustrated in FIG. 22 is a portable information terminal that operates as a portable computer, a multifunctional cellular phone, a voice communicable portable computer, or a communicable portable computer and is also referred to as what is called a smartphone or a tablet device. This portable information terminal includes a display module 562 on the surface of a housing 561, and further includes a control device 563 that controls the display module 562. The display module 562 is the image display device in the present embodiment. In particular, tablet devices or the like are used outside, and thus a rise in temperature is likely to occur. Consequently, the disclosure is particularly effective for the tablet devices.

Second Application Example

FIG. 23 is a schematic block diagram of a meter unit and a car navigation system installed in a vehicle in the present embodiment. The electronic apparatuses illustrated in FIG. 23 are the meter unit and car navigation system installed in a vehicle. The meter unit (electronic apparatus) 570 illustrated in FIG. 23 includes a plurality of image display devices in the present embodiment, such as a fuel gauge, a water temperature gauge, a speedometer, a tachometer, and others, as display devices 571. The meter unit 570 further includes a control device 579 that controls the display devices 571. A plurality of display devices 571 are covered with a single exterior panel 572 together.

Each of the display devices 571 is configured by combining a panel 573 as display means together with a movement mechanism as analog display means. The movement mechanism includes a motor as driving means and an indicator 574 that is rotated by the motor. As illustrated in FIG. 23, the display device 571 is configured such that scale marks, warning displays, and others can be displayed on the display surface of the panel 573 and the indicator 574 of the movement mechanism is rotatable on the display surface side of the panel 573.

While it is configured that a plurality of display devices 571 are provided on a single exterior panel 572 in FIG. 23, it is not limited to this. A single display device 571 may be provided in an area surrounded by the exterior panel 572, and a fuel gauge, a water temperature gauge, a speedometer, a tachometer, and others may be displayed on the display device.

As illustrated in FIG. 23, in a dashboard 577 of a vehicle, a car navigation display device 576 is installed, for example. The car navigation display device 576 includes the image display device in the present embodiment as a display module 575, and further includes a control device 578 that controls the display module 575. The display module 575 is used for a navigation display in the car navigation system, an operation screen display for music, a movie reproduction display, or others. In particular, car navigation devices, vehicle-installed panels, or the like are used outside, and thus a rise in temperature is likely to occur. Consequently, the disclosure is particularly effective for car navigation devices, vehicle-installed panels, or the like.

Each of the embodiments and the modifications are described above. However, the embodiments and the like are not limited to the contents of the embodiments and the like. Further, the constituent elements described above include those that a person skilled in the art can easily assume, that are substantially the same, and that is so-called the range of equivalency. Further, the constituent elements described above can be combined with as appropriate. Various omission, replacement, or changes of the constituent elements should be possible without departing from the scope of the embodiments and the like which are described above.

7. Aspects of Present Disclosure

The present disclosure includes the following aspects:
(1) A light emitting device comprising:
    a base that includes at least a frame body;
    a light source that emits light; and
    a temperature sensor with which the base is provided and that detects changes in temperature of the light source, wherein
    a space is provided between the temperature sensor and a portion of the base corresponding to a portion in which the temperature sensor is provided.
(2) The light emitting device according to (1), wherein the space is provided with a heat insulating member.
(3) The light emitting device according to (1), wherein
    the frame body is provided therein with a light guide plate that the light from the light source enters,
    the frame body is provided with a first substrate and a second substrate with a bonding portion therebetween on at least a part of inner circumference of the frame body,
    the first substrate is provided with the light source,
    the temperature sensor with which the frame body is provided is placed with the second substrate therebetween at a location adjacent to the light source, and
    the space is provided between a portion of the second substrate on a surface to which the bonding portion is bonded and opposite to another portion of the second substrate on a side provided with the temperature sensor and the frame body provided with the second substrate.
(4) The light emitting device according to (1), wherein
    the base further includes a bottom portion that covers an end portion on one side of the frame body,
    the bottom portion is provided with a first substrate,
    the first substrate is provided with the light source,
    the frame body is provided with a second substrate with a bonding portion therebetween on at least a part of inner circumference of the frame body,
    the temperature sensor with which the frame body is provided is placed with the second substrate therebetween at a location adjacent to the light source, and
    the space is provided between a portion of the second substrate on a surface to which the bonding portion is bonded and opposite to another portion of the second substrate on a side provided with the temperature sensor and the frame body provided with the second substrate.
(5) The light emitting device according to (1), wherein
    the frame body is provided therein with a first substrate that is transparent,
    the first substrate is provided with the light source,
    the frame body is provided with a second substrate with a bonding portion therebetween on at least a part of inner circumference of the frame body,
    the temperature sensor with which the frame body is provided is placed with the second substrate therebetween at a location adjacent to the light source, and
    the space is provided between a portion of the second substrate on a surface to which the bonding portion is bonded and opposite to another portion of the second substrate on a side provided with the temperature sensor and the frame body provided with the second substrate.

(6) The light emitting device according to (3), wherein the first substrate and the second substrate are integrally formed.
(7) The light emitting device according to (3), wherein the space is formed with a recessed portion that is provided on inner circumference of the frame body and at a portion of the second substrate opposite to another portion on a side provided with the temperature sensor.
(8) The light emitting device according to (7), wherein the frame body is provided with a projecting portion at a portion on outer circumference of the frame body and facing a portion in which the recessed portion is provided.
(9) The light emitting device according to (1), wherein the light source is a light emitting diode (LED).
(10) An image display device comprising:
  the light emitting device according to (1); and
  an image display module that is irradiated with light from the light emitting device and displays an image.
(11) The image display device according to (10), further comprising:
  a temperature-change acquiring module that is electrically coupled to the temperature sensor and acquires information on changes in temperature of the light source from the temperature sensor; and
  a temperature adjusting module that is electrically coupled to the temperature-change acquiring module and adjusts temperature of the light emitting device based on the information on changes in temperature of the light source from the temperature-change acquiring module.
(12) The image display device according to (11), wherein
  the temperature-change acquiring module includes a temperature calculating module that calculates internal temperature of the light emitting device based on the information on changes in temperature of the light source, and
  the temperature adjusting module adjusts the temperature of the light emitting device based also on the internal temperature of the light emitting device.
(13) The image display device according to (12), wherein the temperature-change acquiring module further includes a temperature correcting module that corrects the temperature of the light emitting device calculated by the temperature calculating module based on a distance between the light source and the temperature sensor.
(14) The image display device according to (11), wherein
  the temperature adjusting module includes a light-source adjusting module that is electrically coupled to the light source and controls the light source, and
  the temperature adjusting module adjusts the temperature of the light emitting device by controlling the light source by the light-source adjusting module.
(15) An electronic apparatus comprising:
  the image display device according to claim 10; and
  a control device that controls the image display device.
(16) An electronic apparatus comprising:
  the image display device according to claim 10;
  a control device that controls the image display device;
  a temperature-change acquiring module that is electrically coupled to the temperature sensor and acquires information on changes in temperature of the light source from the temperature sensor; and
  a temperature adjusting module that is electrically coupled to the temperature-change acquiring module and adjusts temperature of the light emitting device based on the information on changes in temperature of the light source from the temperature-change acquiring module.
(17) The electronic apparatus according to (16), wherein
  the temperature-change acquiring module includes a temperature calculating module that calculates internal temperature of the light emitting device based on the information on changes in temperature of the light source, and
  the temperature adjusting module adjusts the temperature of the light emitting device based also on the internal temperature of the light emitting device.
(18) The electronic apparatus according to (17), wherein the temperature-change acquiring module further includes a temperature correcting module that corrects the temperature of the light emitting device calculated by the temperature calculating module based on a distance between the light source and the temperature sensor.
(19) The electronic apparatus according to (16), wherein
  the temperature adjusting module includes a light-source adjusting module that is electrically coupled to the light source and controls the light source, and
  the temperature adjusting module adjusts the temperature of the light emitting device by controlling the light source by the light-source adjusting module.
(20) A light emitting device comprising:
  a base that includes at least a frame body;
  a light source that emits light; and
  a temperature sensor with which the base is provided and that detects changes in temperature of the light source, wherein
  a heat insulating member is provided between the temperature sensor and a portion of the base corresponding to a portion in which the temperature sensor is provided.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:
1. A light emitting device comprising:
  a base that includes at least a frame body;
  a light source configured to emit light; and
  a temperature sensor configured to detect changes in temperature of the light source, wherein
  a space is provided between the temperature sensor and a portion of the base corresponding to a portion in which the temperature sensor is provided.
2. The light emitting device according to claim 1, wherein the space is provided with a heat insulating member.
3. The light emitting device according to claim 1, further comprising:
  a light guide plate that is provided in the frame body and that the light from the light source enters;
  a first substrate provided with the light source;
  a second substrate provided on at least a part of inner circumference of the frame body; and
  a bonding portion provided between the second substrate and the frame body,
  the temperature sensor, which is provided on the second substrate, is provided on the frame body at a location adjacent to the light source,
  the second substrate has:
    a front surface having a first portion on which the temperature sensor is disposed; and a back surface having a second portion which is opposite to the first portion,
the bonding portion is bonded on the back surface, and
the space is provided between the second portion of the back surface of the second substrate and the frame body.

4. The light emitting device according to claim 3, wherein the first substrate and the second substrate are integrally formed.

5. The light emitting device according to claim 3, wherein the space is formed with a recessed portion that is provided on inner circumference of the frame body and at a portion of the second substrate opposite to another portion on a side provided with the temperature sensor.

6. The light emitting device according to claim 5, wherein the frame body is provided with a projecting portion at a portion on outer circumference of the frame body and facing a portion in which the recessed portion is provided.

7. The light emitting device according to claim 1, further comprising:
a first substrate that is a bottom portion of the base covering an end portion on one side of the frame body and that is provided with the light source;
a second substrate provided on at least a part of inner circumference of the frame body; and
a bonding portion provided between the second substrate and the frame body, wherein
the temperature sensor, which is provided on the second substrate, is provided at a location adjacent to the light source on the frame body,
the second substrate has:
a front surface having a first portion on which the temperature sensor is disposed; and
a back surface having a second portion which is opposite to the first portion, the bonding portion being bonded on the back surface, and
the space is provided between the second portion of the back surface of the second substrate and the frame body.

8. The light emitting device according to claim 1, further comprising:
a first substrate that is transparent;
and provided with the light source in the frame body;
a second substrate provided on at least a part of inner circumference of the frame body; and
a bonding portion provided between the second substrate and the frame body, wherein
the temperature sensor, which is provided on the second substrate, is provided at a location adjacent to the light source on the frame body,
the second substrate has:
a front surface having a first portion on which the temperature sensor is disposed; and
a back surface having a second portion which is opposite to the first portion, the bonding portion being bonded on the back surface, and
the space is provided between the second portion of the back surface of the second substrate and the frame body.

9. The light emitting device according to claim 1, wherein the light source is a light emitting diode (LED).

10. An image display device comprising:
the light emitting device according to claim 1; and
an image display module that is irradiated with light from the light emitting device and displays an image.

11. The image display device according to claim 10, further comprising:

a temperature-change acquiring module that is electrically coupled to the temperature sensor and acquires information on changes in temperature of the light source from the temperature sensor; and
a temperature adjusting module that is electrically coupled to the temperature-change acquiring module and adjusts temperature of the light emitting device based on the information on changes in temperature of the light source from the temperature-change acquiring module.

12. The image display device according to claim 11, wherein
the temperature-change acquiring module includes a temperature calculating module that calculates internal temperature of the light emitting device based on the information on changes in temperature of the light source, and
the temperature adjusting module adjusts the temperature of the light emitting device based also on the internal temperature of the light emitting device.

13. The image display device according to claim 12, wherein the temperature-change acquiring module further includes a temperature correcting module that corrects the temperature of the light emitting device calculated by the temperature calculating module based on a distance between the light source and the temperature sensor.

14. The image display device according to claim 11, wherein
the temperature adjusting module includes a light-source adjusting module that is electrically coupled to the light source and controls the light source, and
the temperature adjusting module adjusts the temperature of the light emitting device by controlling the light source by the light-source adjusting module.

15. An electronic apparatus comprising:
the image display device according to claim 10; and
a control device that controls the image display device.

16. An electronic apparatus comprising:
the image display device according to claim 10;
a control device that controls the image display device;
a temperature-change acquiring module that is electrically coupled to the temperature sensor and acquires information on changes in temperature of the light source from the temperature sensor; and
a temperature adjusting module that is electrically coupled to the temperature-change acquiring module and adjusts temperature of the light emitting device based on the information on changes in temperature of the light source from the temperature-change acquiring module.

17. The electronic apparatus according to claim 16, wherein
the temperature-change acquiring module includes a temperature calculating module that calculates internal temperature of the light emitting device based on the information on changes in temperature of the light source, and
the temperature adjusting module adjusts the temperature of the light emitting device based also on the internal temperature of the light emitting device.

18. The electronic apparatus according to claim 17, wherein the temperature-change acquiring module further includes a temperature correcting module that corrects the temperature of the light emitting device calculated by the temperature calculating module based on a distance between the light source and the temperature sensor.

19. The electronic apparatus according to claim 16, wherein the temperature adjusting module includes a light-source adjusting module that is electrically coupled to the light source and controls the light source, and the temperature adjusting module adjusts the temperature of the light emitting device by controlling the light source by the light-source adjusting module.

20. A light emitting device comprising:

a base that includes at least a frame body;

a light source that emits light; and a temperature sensor with which the base is provided and that detects changes in temperature of the light source, wherein a heat insulating member is provided between the temperature sensor and a portion of the base corresponding to a portion in which the temperature sensor is provided.

* * * * *